US011379960B2

(12) United States Patent
Li et al.

(10) Patent No.: US 11,379,960 B2
(45) Date of Patent: Jul. 5, 2022

(54) IMAGE PROCESSING METHOD, IMAGE PROCESSING APPARATUS, AND WEARABLE DEVICE

(71) Applicants: Beijing BOE Optoelectronics Technology Co., Ltd., Beijing (CN); BOE Technology Group Co., Ltd., Beijing (CN)

(72) Inventors: Gang Li, Beijing (CN); Lili Chen, Beijing (CN); Jiankang Sun, Beijing (CN); Fuqiang Ma, Beijing (CN); Liyang Cui, Beijing (CN); Minglei Chu, Beijing (CN); Yachong Xue, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 281 days.

(21) Appl. No.: 16/718,731

(22) Filed: Dec. 18, 2019

(65) Prior Publication Data
US 2020/0311888 A1    Oct. 1, 2020

(30) Foreign Application Priority Data
Mar. 29, 2019    (CN) .............................. 201910251347

(51) Int. Cl.
*G06T 5/40*    (2006.01)
*G02B 27/00*   (2006.01)
*G02B 27/01*   (2006.01)

(52) U.S. Cl.
CPC ............ *G06T 5/40* (2013.01); *G02B 27/0081* (2013.01); *G02B 27/0093* (2013.01); *G02B 27/017* (2013.01)

(58) Field of Classification Search
CPC ........... G06K 9/00597; G06K 9/00248; G06K 9/00234; G06K 9/00604; G06K 9/0061;
(Continued)

(56) References Cited

U.S. PATENT DOCUMENTS

2005/0047656 A1* 3/2005 Luo .......................... G06T 7/90
                                                        382/167
2006/0280361 A1* 12/2006 Umeda ..................... G06T 7/90
                                                        382/167
(Continued)

FOREIGN PATENT DOCUMENTS

CN    101281646 A    10/2008
CN    101923645 A    12/2010
(Continued)

OTHER PUBLICATIONS

Research on Pupil Center Localization in Eye Gaze Tracking System (Year: 2018).*
(Continued)

*Primary Examiner* — Nizar N Sivji
(74) *Attorney, Agent, or Firm* — Fay Sharpe LLP

(57) ABSTRACT

Embodiments of the present disclosure provides an image processing method, comprising: acquiring an initial image comprising an image of pupil; acquiring an accumulative histogram set of grayscale values of pixels in the initial image; determining a threshold for binarizing the initial image according to a grayscale value corresponding to a target region in respective accumulative histograms in the accumulative histogram set, wherein the target region corresponds to the image of pupil in the initial image; and binarizing the initial image according to the threshold. An image processing apparatus and a wearable device are further provided.

18 Claims, 11 Drawing Sheets

(58) Field of Classification Search
CPC .......... G06K 9/342; G06K 9/4642; G06T 2207/30041; G06T 7/13; G06T 5/40; G06T 7/11; G06T 7/136; G02B 2027/0178; G02B 2027/0187; G02B 27/0081; G02B 27/0093; G02B 27/017
See application file for complete search history.

(56) References Cited

U.S. PATENT DOCUMENTS

| | | | |
|---|---|---|---|
| 2007/0291983 A1* | 12/2007 | Hammoud | G06T 7/20 382/103 |
| 2008/0253622 A1* | 10/2008 | Tosa | G06T 7/168 382/117 |
| 2010/0026831 A1 | 2/2010 | Ciuc et al. | |
| 2011/0150334 A1* | 6/2011 | Du | G06K 9/00604 382/173 |
| 2013/0016906 A1* | 1/2013 | Kakino | G06T 7/11 382/169 |
| 2016/0063305 A1* | 3/2016 | Matsunaga | G06T 5/005 382/167 |
| 2016/0253550 A1* | 9/2016 | Zhang | G06K 9/4604 382/203 |
| 2018/0153397 A1* | 6/2018 | Kim | G06K 9/38 |
| 2019/0290199 A1* | 9/2019 | Curcio | H04N 19/12 |

FOREIGN PATENT DOCUMENTS

| | | |
|---|---|---|
| CN | 102750584 A | 10/2012 |
| CN | 106022315 A | 10/2016 |
| WO | WO-2020190648 A1 * 9/2020 | .......... G06T 7/0012 |

OTHER PUBLICATIONS

Iris Recognition using Corner Detection (Year: 2010).*
A Pupil Location Method Based on Improved Otsu Algorithm (Year: 2012).*
A Robust Pupil Detection Algorithm based on a New Adaptive Thresholding Procedure (Year: 2019).*
First office action of Chinese application No. 201910251347.6 dated Aug. 19, 2020.
Gheis Mohammadi et.al, A Fast and Accurate Pupil and Iris Localization Method Usable with a Regular Camera; International Journal of Computer Science and Information Security, vol. 13, No. 5; May 31, 2015, pp. 74-77.
Silong Wang, et al; Computer-Aided Extraction of Structural Information From Gravity and Magnetic Data by Hough Transformation; Journal of China Coal Society, vol. 23, No. 4; Aug. 31, 1998, pp. 342-346.
Chatchai Wangwiwattana et.al; PupilNet, Measuring Task Evoked Pupillary Response using Commodity RGB Tablet Cameras: Comparison to Mobile, Infrared Gaze Trackers for Inferring Cognitive Load; Proceedings of the ACM on Interactive, Mobile, Wearable and Ubiquitous Technologies, vol. 1, No. 4; Dec. 31, 2017, pp. 1-26.

* cited by examiner

IMAGE PROCESSING METHOD, IMAGE PROCESSING APPARATUS, AND WEARABLE DEVICE

This application claims priority to Chinese Patent Application No. 201910251347.6, filed on Mar. 29, 2019 and entitled "IMAGE PROCESSING METHOD, APPARATUS, AND WEARABLE DEVICE", the entire contents of which are incorporated herein by reference.

TECHNICAL FIELD

Embodiments of the present disclosure relates to an image processing method, an image processing apparatus, and a wearable device.

BACKGROUND

The eye-tracking technology is important for acquiring visual perceptions, and a gaze region of the human eye on a gazed object can be obtained by detecting a central position of pupil of a human eye and mapping the position to the object gazed by the human eye.

SUMMARY

At least one embodiment of the present disclosure provides an image processing method, comprising:
acquiring an initial image comprising an image of pupil;
acquiring an accumulative histogram set of grayscale values of pixels in the initial image;
determining a threshold for binarizing the initial image according to a grayscale value corresponding to a target region in respective accumulative histograms in the accumulative histogram set, wherein the target region corresponds to the image of pupil in the initial image; and
binarizing the initial image according to the threshold.

In some embodiments of the present disclosure, the target region in the respective accumulative histograms is a smooth region closest to a region having a smallest grayscale value in the respective accumulative histograms, wherein a difference between every two adjacent accumulative values of the smooth region is less than a target difference threshold.

In some embodiments of the present disclosure, determining the threshold for binarizing the initial image according to the grayscale value corresponding to the target region in the respective accumulative histograms in the accumulative histogram set comprises:
comparing a reference absolute value with a first difference threshold by taking a first non-zero grayscale value in the respective accumulative histogram as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;
repeatedly comparing the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;
determining the current $i^{th}$ grayscale value as a start grayscale value in the respective accumulative histogram, wherein the grayscale value corresponding to the target region comprises the start grayscale value; and
determining the threshold according to the start grayscale value in the accumulative histogram set.

In some embodiments of the present disclosure, determining the threshold according to the start grayscale value in the accumulative histogram set comprises:
repeatedly comparing the reference absolute value with a second difference threshold by taking the current $(i+x)^{th}$ grayscale value as the $i^{th}$ grayscale value until a quantity of reference absolute values that are consecutive and are less than the second difference threshold reaches a second counting threshold;
determining the current $i^{th}$ grayscale value as an end grayscale value in the respective accumulative histograms, wherein the grayscale value corresponding to the target region comprises the end grayscale value; and
determining the threshold according to the start grayscale value and the end grayscale value in the accumulative histogram set.

In some embodiments of the present disclosure, the accumulative histogram set comprises a plurality of accumulative histograms; and determining the threshold according to the start grayscale value and the end grayscale value in the accumulative histogram set comprises:
determining a threshold candidate value of the respective accumulative histograms according to the start grayscale value and the end grayscale value of the respective accumulative histograms; and
determining any of an average value and a weighted average value of the threshold candidate values of the respective accumulative histograms as the threshold.

In some embodiments of the present disclosure, determining the threshold candidate value of the respective accumulative histograms according to the start grayscale value and the end grayscale value of the respective accumulative histograms comprises:
determining a grayscale value set according to the start grayscale value and the end grayscale value of the respective accumulative histograms, wherein the grayscale value set comprises the start grayscale value and the end grayscale value, and grayscale values between the start grayscale value and the end grayscale value; and
determining the threshold candidate value of the respective accumulative histograms according to the grayscale value set, the threshold candidate value being any of a random value, a maximum value, a minimum value, an average value, a weighted average value of the grayscale values in the grayscale value set, and an average value of the maximum value and the minimum value.

In some embodiments of the present disclosure, the accumulative histogram set comprises at least one of a first accumulative histogram and a second accumulative histogram, and the second accumulative histogram is obtained by performing edge blurring on the first accumulative histogram.

In some embodiments of the present disclosure, the accumulative histogram set comprise a first accumulative histogram; and acquiring the accumulative histogram set of grayscale values of pixels in the initial image comprises:
establishing a histogram based on the initial image, wherein a horizontal axis of the histogram represents grayscale values, and a vertical axis of the histogram represents distribution of pixels with respective grayscale values; and
establishing the first accumulative histogram based on the histogram, wherein a horizontal axis of the first accumulative histogram represents grayscale values, and a vertical axis of the first accumulative histogram represents accumulation of the distribution of the pixels with the respective grayscale values.

In some embodiments of the present disclosure, after binarizing the initial image according to the threshold, the method further comprises: performing at least one of edge detection and ellipse fitting on a binarized image to obtain a pupil positioning image.

In some embodiments of the present disclosure, the accumulative histogram set comprise a first accumulative histogram and a second accumulative histogram; and acquiring the accumulative histogram set of grayscale values of pixels in the initial image comprises:

establishing a histogram based on the initial image, wherein a horizontal axis of the histogram represents grayscale values, and a vertical axis of the histogram represents ratios of pixels with the respective grayscale values; and establishing the first accumulative histogram based on the histogram, wherein a horizontal axis of the first accumulative histogram represents the grayscale values, and a vertical axis of the first accumulative histogram represents an accumulative value of the ratios of the pixels with the respective grayscale values; and performing edge blurring on the first accumulative histogram to obtain the second accumulative histogram;

after binarizing the initial image according to the threshold, the method further comprises:

performing at least one of edge detection and ellipse fitting on a binarized image to obtain a pupil positioning image.

At least one embodiment of the present disclosure provides an image processing apparatus, comprising:

a processor; and a memory, configured to store at least one instruction executable by the processor;

wherein the processor is configured to:

acquire an initial image comprising an image of pupil;

acquire an accumulative histogram set of grayscale values of pixels in the initial image;

determine a threshold for binarizing the initial image according to a grayscale value corresponding to a target region in respective accumulative histograms in the accumulative histogram set, wherein the target region corresponds to the image of pupil in the initial image; and binarize the initial image according to the threshold.

In some embodiments of the present disclosure, the processor is further configured to:

compare a reference absolute value with a first difference threshold by taking a first non-zero grayscale value in the respective accumulative histograms as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;

repeatedly compare the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;

determine the current $i^{th}$ grayscale value as a start grayscale value in the respective accumulative histograms, wherein the grayscale value corresponding to the target region comprises the start grayscale value; and determine the threshold according to the start grayscale value in the accumulative histogram set.

In some embodiments of the present disclosure, the processor is further configured to:

repeatedly compare the reference absolute value with a second difference threshold by taking the current $(i+x)^{th}$ grayscale value as the $i^{th}$ grayscale value until a quantity of reference absolute values that are consecutive and are less than the second difference threshold reaches a second counting threshold;

determine the current $i^{th}$ grayscale value as an end grayscale value in the respective accumulative histograms, wherein the grayscale value corresponding to the target region comprises the end grayscale value; and determine the threshold according to the start grayscale value and the end grayscale value in the accumulative histogram set.

In some embodiment of the present disclosure, the accumulative histogram set comprises a plurality of accumulative histograms; and the processor is further configured to:

determine a threshold candidate value of the respective accumulative histograms according to the start grayscale value and the end grayscale value of the respective accumulative histograms; and determine one of an average value of the threshold candidate value of the plurality of accumulative histograms and a weighted average value of the threshold candidate value of the plurality of accumulative histograms as the threshold.

In some embodiment of the present disclosure, the processor is further configured to:

determine a grayscale value set according to the start grayscale value and the end grayscale value of the respective accumulative histograms, wherein the grayscale value set comprises the start grayscale value and the end grayscale value, and grayscale values between the start grayscale value and the end grayscale value; and determine a threshold candidate value of the respective accumulative histograms according to the grayscale value set, the threshold candidate value being any of a random value, a maximum value, a minimum value, an average value, and a weighted average value of the grayscale values in the grayscale value set, and an average value of the maximum value and the minimum value.

In some embodiment of the present disclosure, the accumulative histogram set comprises at least one of a first accumulative histogram and a second accumulative histogram, and the second accumulative histogram is obtained by performing edge blurring on the first accumulative histogram.

In some embodiment of the present disclosure, the processor is further configured to perform at least one of edge detection and ellipse fitting on a binarized image to obtain a pupil positioning image.

In some embodiment of the present disclosure, the accumulative histogram set comprises a first accumulative histogram and a second accumulative histogram; and the processor is further configured to:

establish a histogram based on the initial image, wherein a horizontal axis of the histogram represents grayscale values, and a vertical axis of the histogram represents a ratio of pixels with the respective grayscale values; and establish the first accumulative histogram based on the histogram, wherein a horizontal axis of the first accumulative histogram represents the grayscale values, and a vertical axis of the first accumulative histogram represents an accumulative value of the ratios of the pixels with the respective grayscale values;

perform edge blurring on the first accumulative histogram to obtain the second accumulative histogram; and perform at least one of edge detection and ellipse fitting on a binarized initial image to obtain a pupil positioning image.

At least one embodiment of the present disclosure provides a wearable device, comprising the image processing apparatus as described above.

In some embodiments of the present disclosure, the wearable device is an augmented reality (AR) device or a virtual reality (VR) device.

At least one embodiment of the present disclosure provides a non-transitory computer-readable storage medium storing at least one instruction, wherein the computer-readable storage medium, when being run on a processing component, causes the processing component to:

acquire an initial image comprising an image of pupil;

acquire an accumulative histogram set of grayscale values of pixels in the initial image;

determine a threshold for binarizing the initial image according to a grayscale value corresponding to a target region in respective accumulative histograms in the accumulative histogram set, wherein the target region corresponds to the image of pupil in the initial image; and binarize the initial image according to the threshold.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and one of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

The eye-tracking technology is a critical technique for acquiring visual perceptions, and is widely applied in scenarios such as virtual reality (VR) or augmented reality (AR). Nevertheless, the eye-tracking technology may also be applied in other scenarios, for example, a vision control scenario in a smart home environment or a rear mirror control scenario in driving, which is not limited in the embodiments of the present disclosure.

In the eye-tracking technology, a center position of a pupil needs to be extracted, and currently, the center position of the pupil can be extracted through a threshold method. The threshold method is to define a threshold according to a grayscale difference between the pupil of a human eye in a human eye image and the background. And then, binarization is performed according to the threshold, such that the image of pupil is extracted from the human eye image for subsequent processing. However, at present, in most threshold methods, the threshold is defined according to experience, and is at low accuracy. As a result, the precision in positioning the center of the pupil is low.

Figure 1:
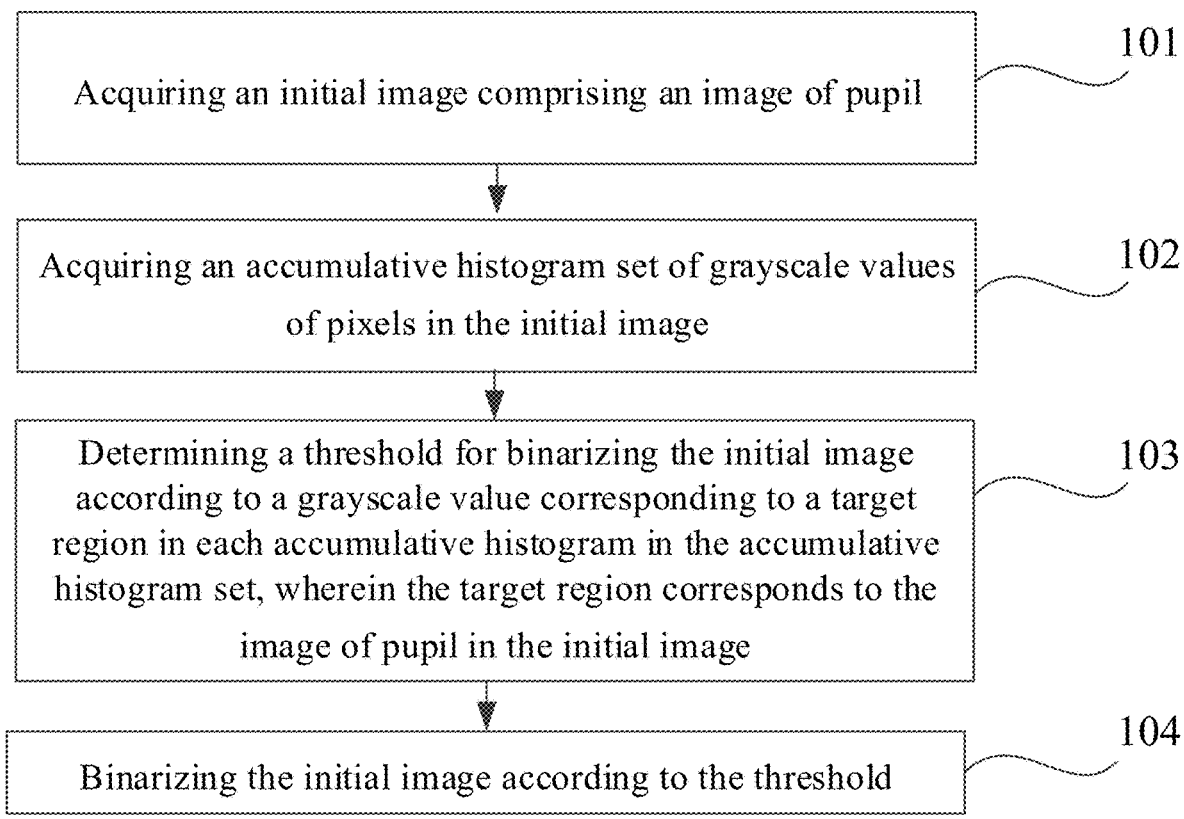
FIG. 1 is a flowchart of an image processing method according to an embodiment of the present disclosure.

An embodiment of the present disclosure provides an image processing method, which can accurately determine a threshold for binarization, thereby improving the robustness of the positioning effect and the precision in positioning the center of the pupil. As illustrated in FIG. 1, the image processing method comprises the following steps:

Step 101: An initial image comprising an image of pupil is acquired.

Step 102: An accumulative histogram set of grayscale values of pixels in the initial image is acquired.

The accumulative histogram set comprises at least one accumulative histogram. The accumulative histogram is configured to characterize accumulation of distributions of pixels with respective grayscale values in the initial image.

Step 103: A threshold for binarizing the initial image is determined according to a grayscale value corresponding to a target region in each accumulative histogram in the accumulative histogram set, wherein the target region corresponds to the image of pupil in the initial image.

Step 104: The initial image is binarized according to the threshold.

In summary, in the embodiment of the present disclosure, an accumulative histogram set is acquired according to an acquired initial image, and a threshold for binarization is determined according to a grayscale value corresponding to a target region in the accumulative histogram set. Since the threshold is determined according to the characteristics of the histogram of the initial image and no farfetched assumption exists, the positioning effect has a high robustness, and the precision in positioning the center of the pupil is high.

At least one embodiment of the present disclosure provides an image processing method, wherein a threshold can be determined according to an accumulative histogram set (comprising at least one accumulative histogram). In addition, when the number of accumulative histograms for determining the threshold varies, the image processing method is different accordingly. The image processing method according to the embodiments of the present disclosure will be described in the following two aspects, and the image processing method is applicable to an image processing apparatus.

Figure 2:
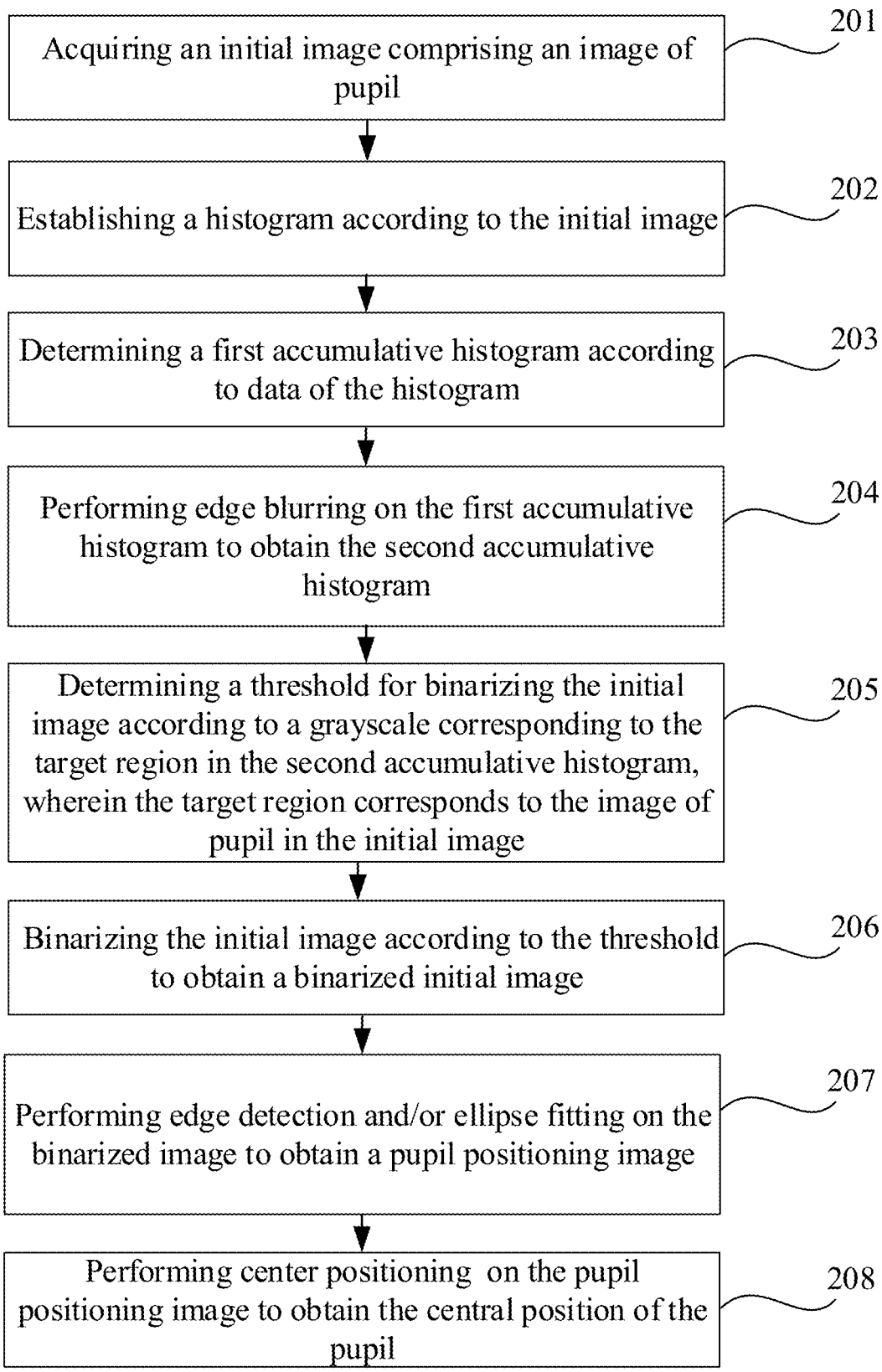
FIG. 2 is a flowchart of an image processing method according to another embodiment of the present disclosure.

In a first aspect, a accumulative histogram set for determining a threshold comprises a second accumulative histogram, wherein the second accumulative histogram is obtained by edge blurring the first accumulative histogram. As illustrated in FIG. 2, the method comprises:

Step 201: An initial image comprising an image of pupil is acquired.

In one optional implementation, the initial image is an image that is directly acquired by an image processing apparatus. That is, an image acquired directly by the image processing apparatus can be taken as the initial image. The initial image can be captured by an image capturing assembly that is connected to the image processing apparatus or provided in the image processing apparatus, or may be transmitted from another apparatus to the image processing apparatus. The directly acquired image may be a face image (that is, an image at least comprising a human face) or an eye image (that is, an image at least comprising a human eye). Exemplarily, the image processing apparatus may be a VR or AR device. The initial image is an image output by an infrared device configured to capture the eye image that is embedded in the VR or AR device.

In another optional implementation, the initial image is an image that is obtained by pre-processing an eye image, and the image processing apparatus may firstly take the directly acquired image as the eye image. The eye image may be captured by an image capturing assembly that is connected to the image processing apparatus or provided in the image processing apparatus, or may be transmitted from another apparatus to the image processing apparatus. And then, the image processing apparatus may pre-process the eye image to obtain the initial image.

In some embodiments of the present disclosure, the pre-processing comprises at least one of: characteristic extraction, light spot detection, and repairing. Since the acquired eye image may be acquired by an image capturing assembly having a large field of view, the eye image may comprise not only an image comprising the human eye, but also other images comprising human face regions, for example, images comprising eyebrow, nose, forehead or event hair or the like. Direct processing on the eye image may be subjected to great interference or uncertainty. Therefore, in the embodiments of the present disclosure, by pre-processing the eye image, the initial image just comprising all or a part of the images comprising the human eye may be acquired, to reduce the complexity of subsequent processing, lower the probability of incorrect positioning of the center of pupil in the subsequent processing, and improve the precision in positioning the center of pupil.

For ease of understanding, the pre-processing process of the embodiment of the present disclosure will be described the following aspects:

First, the characteristic extraction is to extract a designated feature in the image. Since what is required to be acquired in the embodiment of the present disclosure is an initial image comprising an image of pupil, the designated feature is the pupil feature. Exemplarily, the feature extraction may be a feature extraction processing based on Harr-like feature detection.

Second, the light spot detection is to detect whether a light spot exists in the image. During capturing the eye image, it is probable that an ambient light is dark in a photographing environment. If the human eye inside an AR or VR helmet is to be photographed, due to blocking of the helmet, it is dark inside the helmet; and in addition, if the photographing is carried out at night, the ambient light is dark. If the ambient light in the photographing environment is dark, the image capturing assembly needs to additionally fill flash to the photographing object. However, this may result in light reflection by the photographing object, and as a result, a light spot may be caused in the photographed image of the human eye, especially when an infrared light filling assembly is employed to fill flash to the object, the light spot will be a red spot, which may cause errors in positioning the center of pupil. Therefore, the light spot in the image is required to be detected, such that the light spot is subsequently repaired.

Third, the repairing is to repair an abnormal region in the image. For example, the abnormal region is a region where the light spot is located or a shielded region in the image. When an abnormal region is present in the image, the errors in positioning the center of the pupil may be reduced by repairing the abnormal region.

Step 202: A histogram is established according to the initial image.

The histogram, also referred to as a mass distribution diagram or a statistical histogram. is used to represent data distribution through a series of vertical stripes or line segments having different heights. Generally, the horizontal axis represents a data type, and the vertical axis represents distribution.

In the embodiment of the present disclosure, a histogram is established according to the initial image. The histogram is intended to characterize distribution of pixels with respective grayscale values among the pixels in the initial image. The horizontal axis of the histogram represents a grayscale value, and the vertical axis of the histogram represents distributions of the pixels with the grayscale value in the initial image. The histogram is obtained by performing histogram detection on the initial image. The range of grayscale values of the histogram covers all the grayscale value range contained in the initial image. Exemplarily, the distribution of the pixels with respective grayscale value among the pixels in the initial image can be characterized in various manners. For example, the distribution of the pixels with a grayscale value among the pixels in the initial image may be characterized by a ratio of the number of pixels with the grayscale value to the total number of pixels in the initial image; or the distribution of the pixels with a grayscale value in the pixels in the initial image may be characterized by the number of pixels with the grayscale value.

Figure 3:
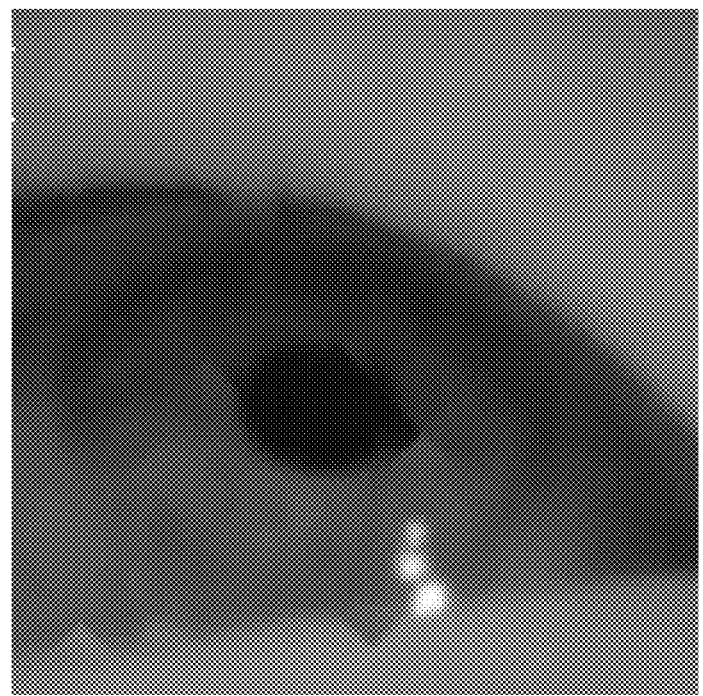
FIG. 3 is a schematic diagram of an initial image according to an embodiment of the present disclosure.
Figure 4:
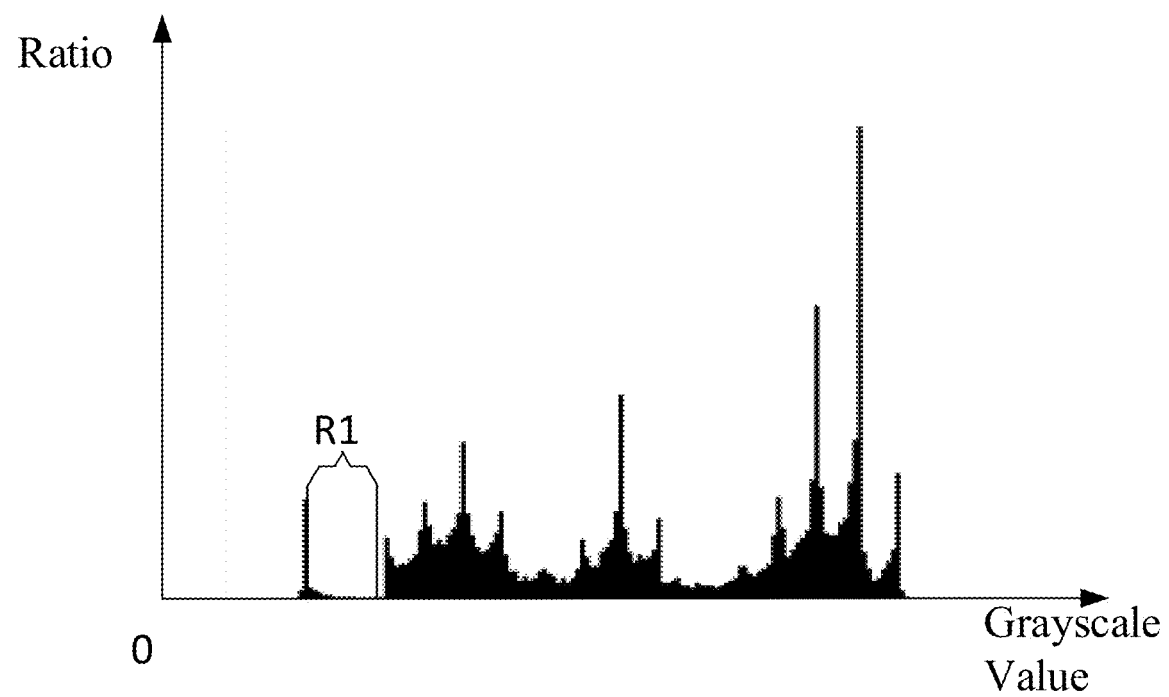
FIG. 4 is a schematic diagram of a histogram according to an embodiment of the present disclosure.

In the embodiments of the present disclosure, it is assumed that the distribution of the pixels with a grayscale value among the pixels in the initial image can be characterized by the ratio of the number of pixels with the grayscale values to the total number of pixels in the initial image. Then, as illustrated in FIG. 3, which is a schematic diagram of an initial image, a histogram that is determined according to the initial image is as illustrated in FIG. 4. In the histogram, the horizontal axis represents a grayscale value, which may be in a numerical range of 0 to 255, and the vertical axis represents a ratio of the number of pixels with respective grayscale values to the total number of pixels in the initial image, which may be in a numerical range of 0 to 1.

The histogram practically represents a discrete function, which satisfies a histogram formula:

$$H(k) = \frac{n_k}{N}, k = 0, 1, \ldots L-1;$$

wherein k represents a grayscale value; L−1 represents an upper limit of a grayscale value range, exemplarily, L−1=255; $n_k$ represents the number of pixels with the grayscale value k in the initial image; N represents the total number of pixels in the image; and H(k) represents a ratio of the number of pixels with the grayscale value k to the total number of pixels in the initial image. Exemplarily, if the number of pixels with the grayscale value 1 is 40, and the total number of pixels is 100, and then, H(1)=0.4.

Figure 5:
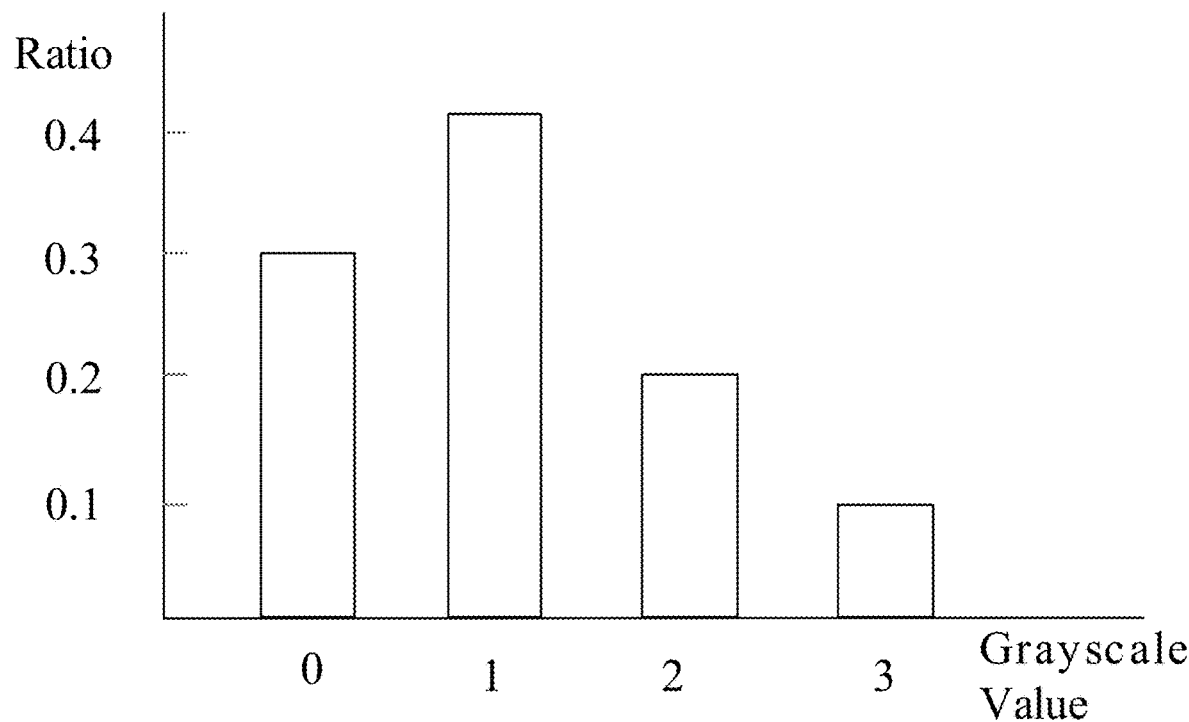
FIG. 5 is a schematic diagram of a histogram according to another embodiment of the present disclosure.

Referring to FIG. 5, four bars are illustrated, which respectively correspond to the ratios of the numbers of pixels with four grayscale values in the initial image to the total number of pixels contained in the initial image. The ratios corresponding to the bars with the grayscale values 0, 1, 2 and 3 are respectively 0.3, 0.4, 0.2 and 0.1.

Nevertheless, the horizontal axis and the vertical axis of the histogram may also represent other meanings. For example, the vertical axis represents a grayscale value, and the horizontal axis represents a ratio of the number of pixels with respective grayscale values to the total number of pixels in the initial image, which will not be elaborated herein.

Step 203: A first accumulative histogram is determined according to data of the histogram.

The first accumulative histogram, also referred to as an integrating histogram, a statistical histogram or a cumulative histogram, is intended to characterize accumulation of the distribution of the pixels with respective grayscale values in the initial image in the pixels contained in the initial image. Typically, the accumulation is reflected by an accumulation value; and nevertheless, the accumulation may also be reflected by a derivation of the accumulation value.

As described in step 202, the distribution of the pixels with a grayscale value among the pixels in the initial image may be characterized in various manners. Correspondingly, the accumulation value of the distribution may also be represented in various manners. For example, since the distribution of the pixels with the grayscale value among the pixels in the initial image may be characterized by a ratio of the number of pixels with the grayscale value to the total number of pixels in the initial image, an accumulation value of the distribution is an accumulation value of the ratios. For another example, since the distribution of the pixels with a grayscale value among the pixels in the initial image may be characterized by the number of pixels with the grayscale value, the accumulation value of the distribution is an accumulation value of the number. It should be noted that the first accumulative histogram is obtained by piece-wise accumulation with the grayscale value as unit based on the above histogram. Optionally, the accumulation may also be carried out at an interval of d grayscale values, wherein d is a positive integer, and the smaller the d, the higher the precision of the first accumulative histogram that is finally obtained.

Figure 6:
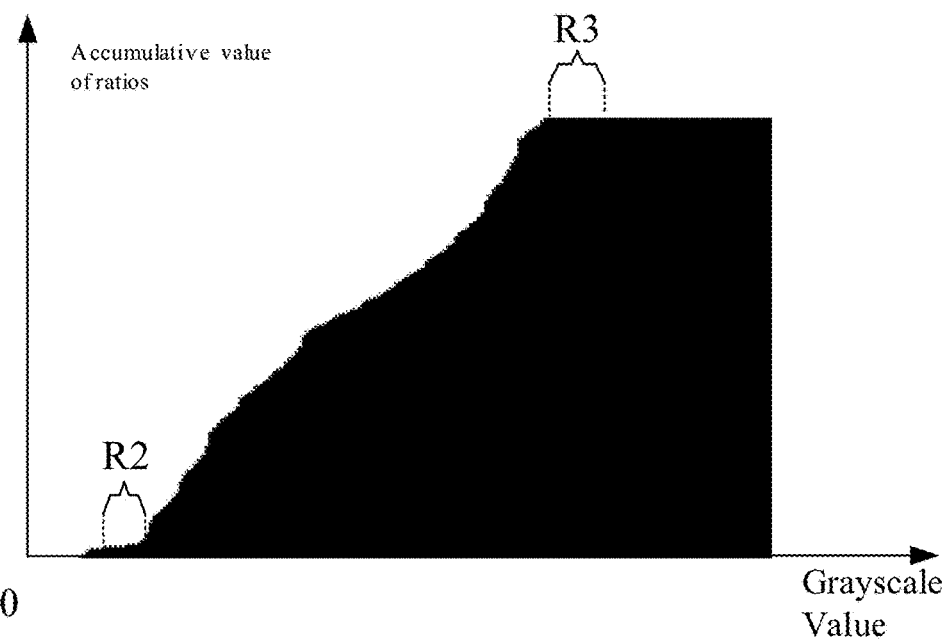
FIG. 6 is a schematic diagram of a first accumulative histogram according to an embodiment of the present disclosure.

In the embodiments of the present disclosure, it is assumed that distribution of pixels with a grayscale value among the pixels in the initial image may be characterized by the ratio of the number of the pixels with the grayscale value to the total number of pixels in the initial image, and the first accumulative histogram is intended to characterize an accumulation value of distribution data of the pixels with respective grayscale values in the initial image in the pixels in the initial image. Then, as illustrated in FIG. 6, a first accumulative histogram is determined according to the histogram as illustrated in FIG. 4 is as illustrated in FIG. 6. In the first accumulative histogram, the horizontal axis represents a grayscale value, which may be in a numerical range of 0 to 255, and the vertical axis represents an accumulation value of ratios of the numbers of pixels with respective grayscale values to the total number of pixels in the initial image, which may be in a numerical range of 0 to 1. As illustrated in FIG. 6, the accumulation value corresponding to respective grayscale values is the sum of the ratios corresponding to all the grayscale values that a not greater than the grayscale value. Therefore, the border of the first accumulative histogram is a monotonously increasing curve.

The first accumulative histogram practically represents a discrete function, which satisfies a first accumulative histogram formula:

$$I(k) = \sum_{i=o}^{k} \frac{n_k}{N}, k = 0, 1, \ldots L-1;$$

wherein k represents a grayscale value; L−1 represents an upper limit of a grayscale value range, exemplarily, L−1=255; $n_k$ represents the number of pixels with the grayscale value k in the initial image; N represents the total number of pixels in the image; and I(k) represents the sum of ratios of the numbers of pixels with grayscale values that are less than or equal to k to the total number of pixels in the initial image. Exemplarily, if the number of pixels with the grayscale value 0 is 30, the number of pixels with the grayscale value 1 is 40, and the total number of pixels is 100, then I(1)=0.3+0.4=0.7.

Figure 7:
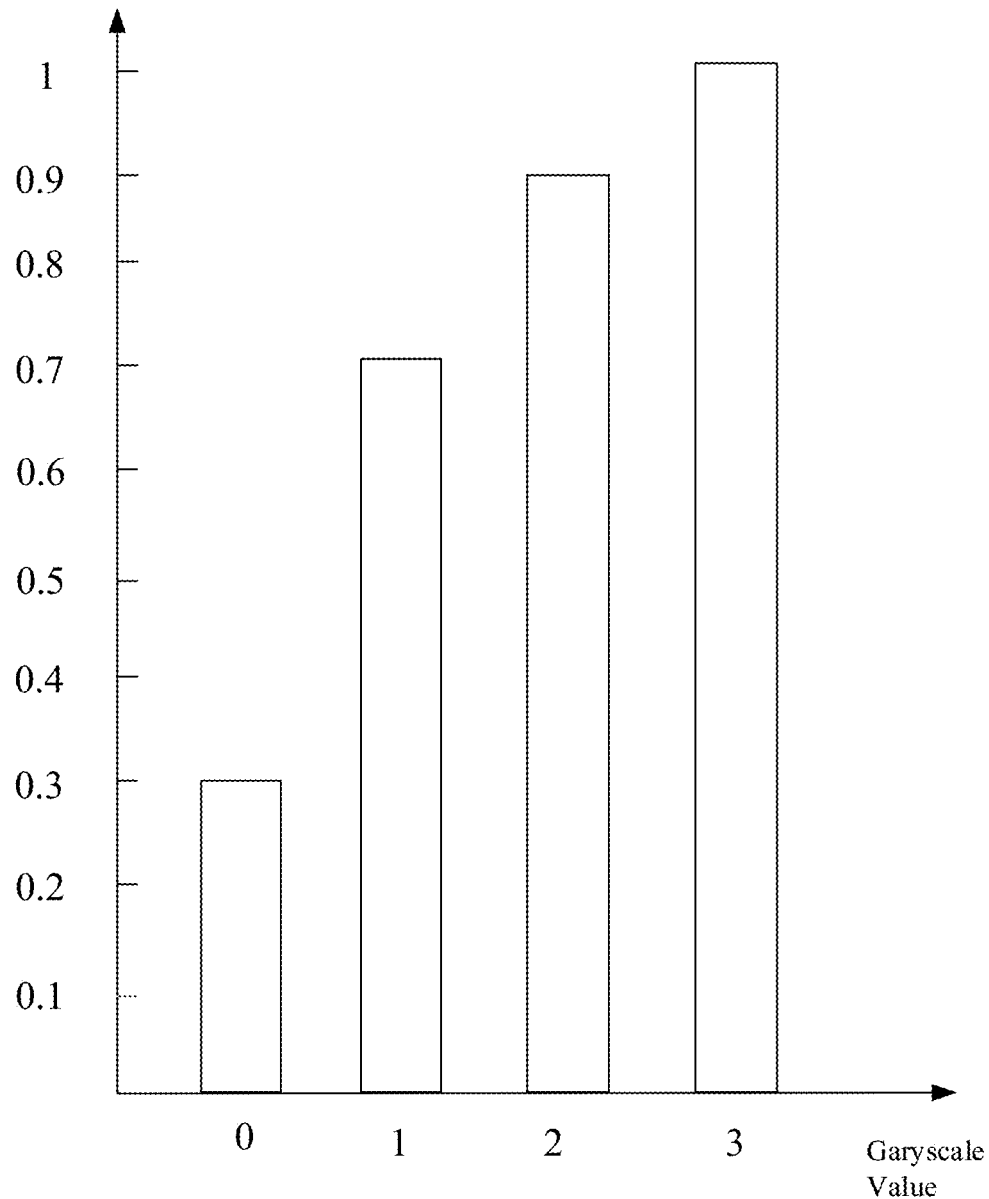
FIG. 7 is a schematic diagram of a first accumulative histogram according to another embodiment of the present disclosure.

Referring to FIG. 7, four bars are illustrated, which respectively correspond to accumulation values of the ratios of the numbers of pixels with four grayscale values in the initial image to the total number of pixels in the initial image. The accumulative histogram illustrated in FIG. 7 is determined according to the histogram illustrated in FIG. 5. The accumulation values of the ratios corresponding to the bars with the grayscale values 0, 1, 2 and 3 are respectively 0.3, 0.7, 0.9 and 1.

Nevertheless, the horizontal axis and the vertical axis of the first accumulative histogram may also represent other meanings. For example, the vertical axis represents a grayscale value, and the horizontal axis represents a accumulation value of ratios of the numbers of pixels with respective grayscale values to the total number of pixels in the initial image, which will be not elaborated herein.

It should be noted that the histogram and the first accumulative histogram may be drawn in various manners. For example, the bars corresponding to two adjacent grayscale values in FIG. 4 and FIG. 6 are adjacent to each other, and the bars corresponding to two adjacent grayscale values in FIG. 5 and FIG. 7 are spaced apart. FIG. 4 and FIG. 7 merely schematically illustrate two manners for drawing the histogram and the first accumulative histogram. The embodiments of the present disclosure do not impose limitations to the drawing of the histogram and the first accumulative histogram.

Step 204: Edge blurring is performed on the first accumulative histogram to obtain the second accumulative histogram.

Figure 8:
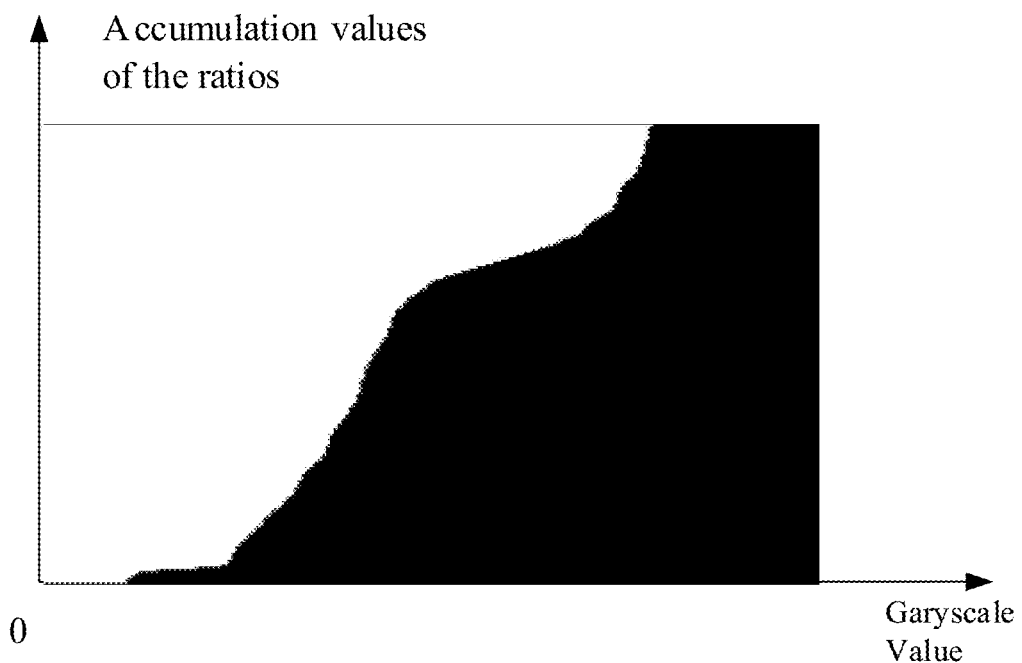
FIG. 8 is a schematic diagram of a second accumulative histogram according to an embodiment of the present disclosure.

The edge blurring is configured to blur an edge of the first accumulative histogram, such that the edge of the obtained second accumulative histogram is smoother. Exemplarily, the edge blurring may be average value blurring or Gaussian blurring. The Gaussian blurring is also referred to as Gaussian smoothening, which is a process of performing convolution on the image to be blurred and normal distribution thereof to obtain a convoluted image. The normal distribution is also referred to as Gaussian distribution. A Gaussian kernel that is employed in the Gaussian blurring may have a size of 3×1, or a size of 5×1. Since the smaller the Gaussian kernel, the better the blurring effect, a 3×1 Gaussian kernel is typically employed. Exemplarily, the second accumulative histogram that is obtained by blurring the first accumulative histogram established in FIG. 6 may be as illustrated in FIG. 8.

A second accumulative histogram obtained by performing Gaussian blurring on the first accumulative histogram may be referred to as an accumulative Gaussian histogram, and the accumulation value in the second accumulative histogram progressively increases more smoothly, and data jumps are reduced. In this way, the subsequent detection for the target region is facilitated, and the precision of detection is further improved while the efficiency of detection is enhanced.

Step 205: A threshold for binarizing the initial image is determined according to a grayscale corresponding to the target region in the second accumulative histogram, wherein the target region corresponds to the image of pupil in the initial image.

In the embodiment of the present disclosure, the threshold detection principle for binarization is according to distribution characteristics of the histogram of the initial image. As illustrated in FIG. 4, it can be observed that a peak is obviously present in a region with a low grayscale value of the histogram. What follows the peak is a region R1 with smaller values. By detecting the position of a pixel with a lowest grayscale value in the initial image, it can be determined that the frontmost peak in the histogram is formed by the pixels with low grayscale values inside the image of pupil (because the pixel with the lowest grayscale value in the initial image is located in the black region of the image of pupil, that is, in the region where the pupil is located). The feature is represented as the portion with a low grayscale value in the accumulative histogram, a smooth and gradually varying accumulation region, that is, a target region R2 corresponding to the image of pupil in the initial image, as illustrated in FIG. 6. The image processing method according to the embodiment of the present disclosure is configured to extract the grayscale value of the target region R2 in the accumulative histogram and take the grayscale value as a threshold, and then perform binarization according to the threshold.

The target region in the accumulative histogram is: a smooth region closest to a region with the minimum grayscale value in the accumulative histogram, wherein a difference between any two adjacent accumulation values in the smooth region is less than a target difference threshold. Therefore, a smooth region closest to a region with the minimum grayscale value in the second accumulative histogram can be determined as a target region in the second accumulative histogram.

Determining the threshold according to the grayscale value corresponding to the target region in the second accumulative histogram in step 205 comprises the following sub-steps:

Sub-step A1: By taking a first non-zero grayscale value in the second accumulative histogram as an $i^{th}$ grayscale value, a reference absolute value is compared with a first difference threshold, wherein the reference absolute value is an absolute value of a difference between an accumulation value corresponding to the ith grayscale value and an accumulation value corresponding to an $(i+x)^{th}$ grayscale value, x being a positive integer.

Exemplarily, $1 \leq i \leq 255$, the smaller the value of x, the higher the precision of the finally determined target region. Exemplarily, $1 \leq x \leq 5$, for example, x=1 or 2. The first difference threshold may be 0.06 times a maximum accumulation value in the second accumulative histogram, and the first difference threshold may also be another value. For example, the first difference threshold may be 0.05 times the maximum accumulation value in the second accumulative histogram or the like, which is not limited in the embodiment of the present disclosure.

Sub-step A2: Taking the $(i+x)^{th}$ grayscale value as the $i^{th}$ grayscale value, the reference absolute value is repeatedly compared with the first difference threshold, until a quantity of reference absolute values that are consecutive and are less than the first difference threshold reaches a first counting threshold.

After each time comparing the reference absolute value with the first difference threshold, the image processing apparatus is required to detect whether the quantity of reference absolute values that are consecutive and less than the first difference threshold reaches the first counting threshold needs. If the quantity of reference absolute values that are consecutive and are less than the first difference threshold does not reach the first counting threshold, the image processing apparatus can take the $(i+x)^{th}$ grayscale value as the $i^{th}$ grayscale value, and then repeatedly compare the reference absolute value with the first difference threshold. If the quantity of reference absolute values that are consecutive and are less than the first difference threshold reaches the first counting threshold, the image processing apparatus stops the comparison, and directly perform sub-step A3.

Alternatively, after each time comparing the reference absolute value with the first difference threshold, if the image processing apparatus determines that the reference absolute value is less than a first interpolation threshold, whether the quantity of reference absolute values that are consecutive and are less than the first difference threshold reaches the first counting threshold is required to be detected. If the quantity of reference absolute values that are consecutive and are less than the first difference threshold does not reach the first counting threshold, or it is determined that the reference absolute value is greater than or equal to the first interpolation threshold, the image processing apparatus may take the $(i+x)^{th}$ grayscale value as the $i^{th}$ grayscale value, and then repeatedly compare the reference absolute value with the first difference threshold. If the quantity of reference absolute values that are consecutive and are less than the first difference threshold reaches the first counting threshold, the image processing apparatus stops the comparison, and directly perform sub-step A3.

For example, it is assumed that the first non-zero grayscale in the second accumulative histogram is the fourth grayscale value, x=2, and the first difference threshold is 0.06, then the image processing apparatus may firstly take the fourth grayscale value as the $i^{th}$ grayscale value, and determine the sixth grayscale value as the $(i+x)^{th}$ grayscale value. If a accumulation value corresponding to the fourth grayscale value is 0.3, and a accumulation value corresponding to the sixth grayscale value is 0.5, the image processing apparatus can determine that the current reference absolute value is 0.2. Upon comparing the reference absolute value (0.2) with the first difference threshold (0.06), the image processing apparatus can determine that the reference absolute value is greater than the first difference threshold.

And then, the image processing apparatus can further take the sixth grayscale value as the i-th grayscale value, and determine the eighth grayscale value as the (i+x)-th grayscale value. If a accumulation value corresponding to the sixth grayscale value is 0.3, and a accumulation value corresponding to the eighth grayscale value is 0.25, the image processing apparatus can determine that the current reference absolute value is 0.05. After comparing the reference absolute value (0.05) with the first difference threshold (0.06), the image processing apparatus can determine that the reference absolute value is less than the first difference threshold. At this time, the image processing apparatus can determine that the quantity of reference absolute values that are consecutive and are less than the first difference threshold is 1; and if the first counting threshold is 2, the image processing apparatus needs to continuously take the eighth grayscale as the i-th grayscale value, and repeatedly perform the above operations until the quantity of reference absolute values that are consecutive and are less than the first difference threshold reaches the first counting threshold.

If the quantity of reference absolute values that are consecutive and are less than the first difference threshold reaches the first counting threshold, the grayscale values corresponding to the reference absolute values may pertain to the grayscale value corresponding to the target region.

Sub-step A3: The current i-th grayscale value is determined as a start grayscale value in the second accumulative histogram, and the grayscale value corresponding to the target region comprises the start grayscale value.

For example, when the first counting threshold is 7, if the quantity of the reference absolute values that are consecutive and are less than the first difference threshold is greater than 7, the image processing apparatus determines that the current i-th grayscale value pertains to the grayscale value (which may be referred to as the start grayscale value) corresponding to the target region in the second accumulative histogram.

Exemplarily, it is assumed that, among the eighth, tenth, twelfth, fourteenth, eighteenth, twentieth and twenty-second grayscale values, an absolute value of a difference between accumulation values corresponding to each two adjacent grayscale values is less than the first difference threshold. Then, when the image processing apparatus detects the twentieth grayscale value (that is, i=20, i+x=22), the quantity of reference absolute values that are consecutive and are less than the first difference threshold reaches 7. Then, the image processing apparatus can determine the twentieth grayscale value as the start grayscale value.

Sub-step A4: a threshold is determined according to the start grayscale value in the second accumulative histogram.

In one optional implementation, the start grayscale value can be directly determined as the threshold.

In another optional implementation, a p-th grayscale flowing the start grayscale value may be directly determined as the threshold, wherein p is a predetermined value, and exemplarily, $2 \leq p \leq 6$.

In still another optional implementation, taking the current (i+x)th grayscale value as the ith grayscale value, the image processing apparatus can repeatedly compare the reference absolute value with a second difference threshold, until a quantity of reference absolute values that are consecutive and are less than the second difference threshold reaches a second counting threshold. Exemplarily, the second difference threshold may be the same as or different from the first difference threshold, and the second counting threshold may be the same as or different from the first counting threshold, which are not limited in the embodiment of the present disclosure. When determining that the quantity of reference absolute values that are consecutive and are less than the second difference threshold reaches a second counting threshold, the image processing apparatus can determine the current i-th grayscale value as an end grayscale value in the second accumulative histogram. The grayscale value corresponding to the target region comprises the end grayscale value. Exemplarily, the second difference threshold is 6. It should be noted that the second difference threshold is defined as 6, and it can be ensured that a difference between the start grayscale value and the end grayscale value is small, such that the target region is prevented from being over-large, and the precision in determining the threshold is ensured.

After the start grayscale value and the end grayscale value are obtained, the image processing apparatus can determine the threshold according to the start grayscale value and the end grayscale value. Exemplarily, the image processing apparatus can firstly determine a grayscale value set according to the start grayscale value and the end grayscale value in the second accumulative histogram, wherein the grayscale value set comprises the start grayscale value and the end grayscale value in the second accumulative histogram, and grayscale values between the start grayscale value and the end grayscale value. And then, the image processing apparatus can determine the threshold according to the grayscale value set. The threshold may be a random value, a maximum value, a minimum value, an average value, or a weighted average value of the grayscale values in the grayscale value set, or an average value of the maximum value and the minimum value or the like.

It should be noted that if the above minimum value is taken as the threshold, that is, the start grayscale value is taken as the threshold, the threshold may be small. In this case, during the binarization, some region of the image of pupil may be considered as the background and thus removed from the initial image. If based on the average value, the weighted average value, or the average value of the maximum value and the minimum value, correction can be made to the small threshold, so as to ensure that the finally obtained threshold is accurate, thereby improving the accuracy in binarization.

In sub-step A1, the case that the first non-zero grayscale value in the second accumulative histogram is taken as the $i^{th}$ grayscale is taken as an example, optionally, in sub-step A1, a zero grayscale value in the second accumulative grayscale value may be taken as the i-th grayscale. Nevertheless, taking the first non-zero grayscale value in the second accumulative histogram as the $i^{th}$ grayscale value can reduce the times of performing the step of comparing the reference absolute value with the first difference threshold, and thus lowering the calculation overhead.

In the above embodiments, the start grayscale value and the end grayscale value corresponding to the target region are determined by identifying the relationship between the grayscale values. Optionally, the target region in the second accumulative histogram can be found according to the characteristic of the target region, and then the start grayscale value and the end grayscale value corresponding to the target region can be looked up in the grayscale values corresponding to the target region.

During determining the target region in the second accumulative histogram, a smooth region is searched for according to the characteristic of the smooth region from the minimum grayscale value in the second accumulative histogram, and a first smooth region that is found is taken as the target region. Alternatively, all the smooth regions in the second accumulative histogram may be firstly found based on the characteristics of the smooth regions, and then, a smooth region closest to the region with a minimum grayscale value in the second accumulative histogram is selected as the target region. As illustrated in FIG. 6, all the smooth regions found in the second accumulative histogram according to the characteristics of the smooth region comprise a smooth region R2 and a smooth region R3, and the smooth region R2 closest to the region with the minimum grayscale value in the accumulative histogram is selected as the target region.

Step 206: The initial image is binarized according to the threshold to obtain a binarized initial image.

The binarization is to define grayscale values of pixel points in an image as two values. That is, the entire image just exhibits a visual effect with two colors. These two values are typically 0 and 255, and the binarized image exhibits an apparent visual effect with black and white.

In the embodiment of the present disclosure, the threshold determined previously can be taken as the threshold for binarization, and the initial image is processed to obtain a binarized image.

Exemplarily, with respect to each pixel point in the initial image, a grayscale value of the pixel point is compared with the threshold. When the grayscale value is less than the threshold, the grayscale value is updated to a first value; and when the grayscale value is greater than or equal to the threshold, the grayscale value is updated to a second value; wherein the first value and the second value are respectively one of two designated values. Exemplarily, the first value and the second value are one of 0 and 255, respectively. For example, the first value is 0, and the second value is 255.

Figure 9:
FIG. 9 is a schematic diagram of an initial image subjected to binarization according to an embodiment of the present disclosure.

After the initial image is binarized according to the threshold, the pupil region in the initial image can be extracted, and a binarized image is obtained. In this case, the binarized image comprises less pixel data with respect to the initial image, and can better reflect the region where the pupil is actually located. Exemplarily, it is assumed that the first value is 0 and the second value is 255, then a binarized image, as illustrated in FIG. 9, can be obtained by binarizing the initial image as illustrated in FIG. 3 according to the threshold determined by the accumulative histogram as illustrated in FIG. 8.

Step 207: Edge detection and/or ellipse fitting is performed on the binarized image to obtain a pupil positioning image.

After the binarized image is obtained, the pupil region can be extracted from the background. Thereafter, for positioning the center of pupil, at least one of the edge detection and ellipse fitting can be performed on the binarized image for further process, so as to obtain the pupil positioning image. An accurate position of the pupil can be determined according to the pupil positioning image.

Step 208: Center positioning is performed on the pupil positioning image to obtain the central position of the pupil.

In step 208, the center positioning can be performed on the pupil positioning image obtained in step 207, and a geometric center obtained can be determined as the central position of the pupil. The geometric center obtained by the positioning is more accurate over the optional implementation mentioned above.

In some embodiments of the present disclosure, the above embodiment is described by taking the scenario where step 207 is performed as an example. However, in practice, step 207 may not be performed, and after the binarized image is obtained, the center positioning is directly performed on the binarized image, and the geometric center obtained by the center positioning is determined as the central position of pupil.

It should be noted that step 202 and step 203 are described by taking the scenario, where a histogram is firstly established and then a first accumulative histogram is established according to the histogram, as an example. Nevertheless, step 202 and step 203 may not be performed, and instead, the first accumulative histogram is directly established according to the initial image, which will not be elaborated herein.

Further, step 204 is an optional step. That is, the image processing apparatus may directly determine, according to the grayscale value corresponding to the target region in the first accumulative histogram, the threshold for binarizing the initial image. In addition, in the process of determining the threshold according to the grayscale value corresponding to the target region in the first accumulative histogram, reference can be made to the process of determining the threshold according to the grayscale value corresponding to the target region in the second accumulative histogram, which will not be elaborated herein. In this case, the accumulative histogram set on the basis of which the threshold is determined only comprises the first accumulative histogram.

Figure 10:
FIG. 10 is a schematic diagram of an initial image subjected to binarization according to another embodiment of the present disclosure.

However, as the second accumulative histogram is obtained by edge blurring, curve variations are smoother and data jumps are fewer, the binarized image determined according to the second accumulative histogram is more accurate. As described in step 206, it is assumed that the first value is 0 and the second value is 255, then a binarized image, as illustrated in FIG. 10, can be obtained by binarizing the initial image as illustrated in FIG. 3 according to the threshold determined by the first accumulative histogram as illustrated in FIG. 6. It is apparent that the binarized image as illustrated FIG. 9 has a clearer border and is subjected to less interference with respect to the binarized image as illustrated in FIG. 10.

Figure 11:
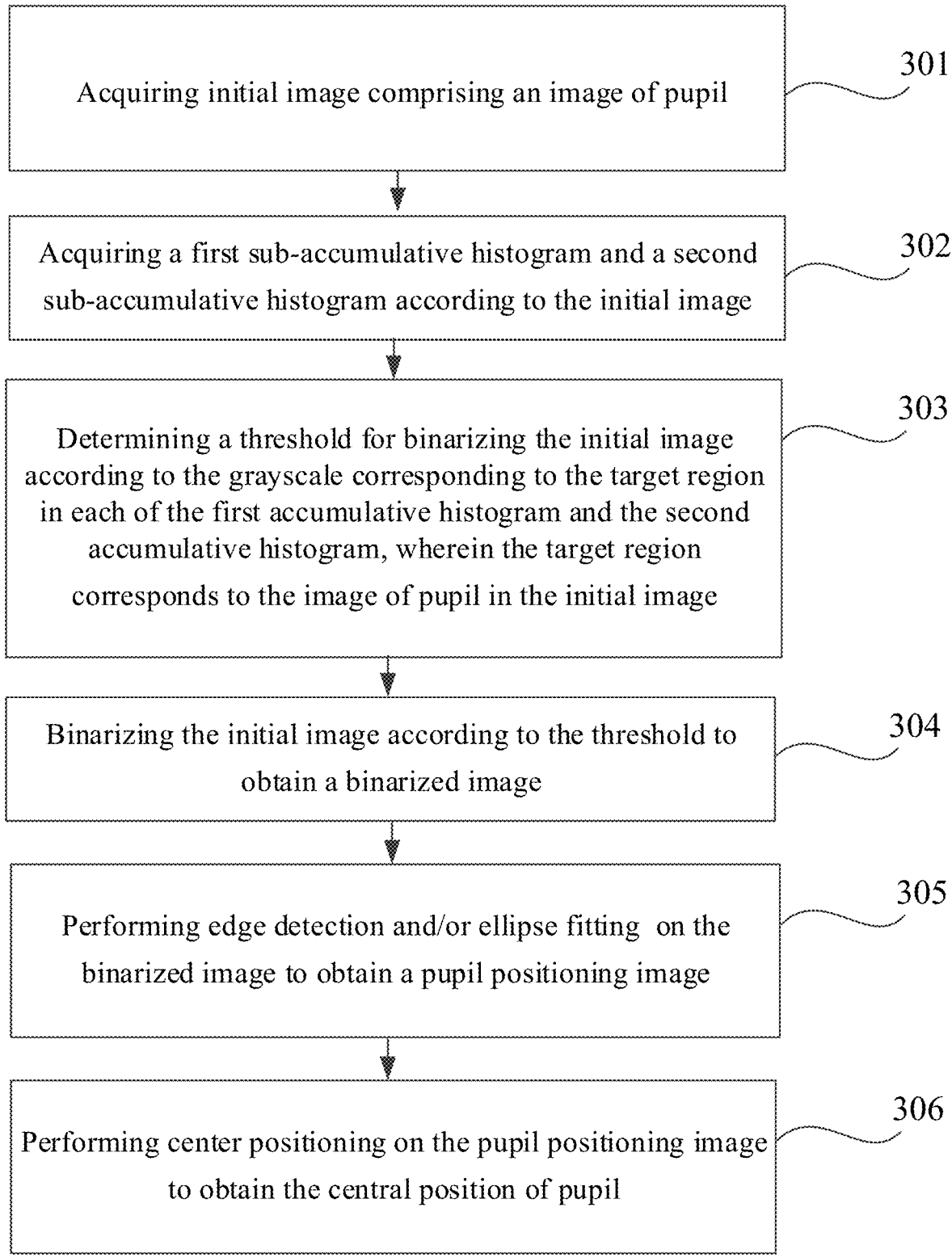
FIG. 11 is a flowchart of an image processing method according to another embodiment of the present disclosure.

In a second aspect, the accumulative histogram set according to which the threshold is determined may comprise a plurality of accumulative histograms. It is assumed that the plurality of accumulative histograms comprise a first accumulative histogram and a second accumulative histogram, then as illustrated in FIG. 11, the method comprises the following steps:

Step 301: An initial image comprising an image of pupil is acquired.

This process of step 301 can be referenced to step 201, which will not be elaborated herein.

Step 302: A first sub-accumulative histogram and a second sub-accumulative histogram are acquired according to the initial image.

Exemplarily, step 302 comprises the following sub-steps:
Sub-step C1: A histogram is established according to the initial image.

This process can be referenced to step 202, which will not be elaborated herein.

Sub-step C2: A first accumulative histogram is determined according to data of the histogram.

This process can be referenced to step 203, which will not be elaborated herein.

Sub-step C3: Edge blurring is performed on the first accumulative histogram to obtain the second accumulative histogram.

This process can be referenced to step 204, which will not be elaborated herein.

Step 303: A threshold for binarizing the initial image is determined according to the grayscale corresponding to the target region in each of the first accumulative histogram and the second accumulative histogram, wherein the target region corresponds to the image of pupil in the initial image.

In the process of determining the threshold according to the grayscale value corresponding to the target region in the accumulative histogram, the image processing apparatus can first determine a threshold candidate value of each of the first accumulative histogram and the second accumulative histogram. The process of determining the threshold candidate value of each of the first accumulative histogram and the second accumulative histogram can be referenced to the process of determining the threshold in step 205, which will not be elaborated herein.

After obtaining the threshold candidate value of each of the first accumulative histogram and the second accumulative histogram, the image processing apparatus can determine the threshold according to the threshold candidate value of each of the first accumulative histogram and the second accumulative histogram. Exemplarily, the image processing apparatus can determine an average value or a weighted average value of the threshold candidate values of the first accumulative histogram and the second accumulative histogram as the threshold. In this way, the threshold candidate values of the first accumulative histogram and the second accumulative histogram are combined, and the finally determined threshold has a high accuracy.

Step 304: The initial image is binarized according to the threshold to obtain a binarized image.

This process of step 304 can be referenced to step 206, which will not be elaborated herein.

Step 305: Edge detection and/or ellipse fitting is performed on the binarized image to obtain a pupil positioning image.

This process of step 305 can be referenced to step 207, which will not be elaborated herein.

Step 306: Center positioning is performed on the pupil positioning image to obtain the central position of pupil.

This process of step 306 can be referenced to step 208, which will not be elaborated herein.

It should be noted that the embodiment as illustrated in FIG. 3 is described by taking the scenario where the accumulative histogram comprises a first accumulative histogram and a second accumulative histogram as an example. Optionally, the accumulative histogram set may further comprise more accumulative histograms, for example, a plurality of second accumulative histograms. Each second accumulative histogram is obtained by performing edge blurring on the first accumulative histogram. In addition, different algorithms are employed for edge blurring on each of the plurality of second accumulative histogram, and/or edge blurring is performed for different times on the plurality of second accumulative histogram. Correspondingly, step 303 may be replaced by determining the threshold according to the grayscale value corresponding to the target region in each accumulative histogram in the accumulative histogram set. Since the threshold is obtained according to combination of more candidate thresholds, the determined threshold is more accurate.

It should be noted that after the central position of pupil is determined in step 208 or step 306, the central position can be mapped to an object gazed by a human eye to obtain a gaze region of the human eye on the gazed object. In this way, visual gaze information of the human is acquired, and a corresponding response is made to the visual gaze information. For example, in a VR or AR scenario, when it is determined that a user gazes an object, a VR or AR image of the object is displayed by a corresponding wearable device; in a vision control scenario in a smart home environment, when it is determined that a user gazes a smart appliance, the smart appliance is controlled to be ON or OFF; and in a rear mirror control scenario in driving, when it is determined that a user gazes a rear mirror, the angle of the rear mirror is adjusted according to an angle at which the user gazes the rear mirror.

In summary, according to the embodiment of the present disclosure, an accumulative histogram set is acquired according to an acquired initial image, and a threshold for binarization is determined according to a grayscale value corresponding to a target region corresponding to the pupil in the accumulative histogram set. Since the threshold is determined according to the characteristics of the histogram of the initial image, and no farfetched assumption exists, the positioning effect has a high robustness, and the precision in positioning the center of pupil is high.

It should be noted that the sequence of the steps in the image processing method according to the embodiments of the present disclosure may be suitably adjusted, and the steps may be reduced or added according to the actual requirements. One of ordinary skill in the art would find it ready to envisage variations within the technical content of the present disclosure, and such variations shall fall within the protection scope of the present disclosure, which will not be elaborated herein.

All the above optional technical solutions may form the optional embodiments of the present disclosure in any combination, which will not be elaborated herein.

Figure 12:
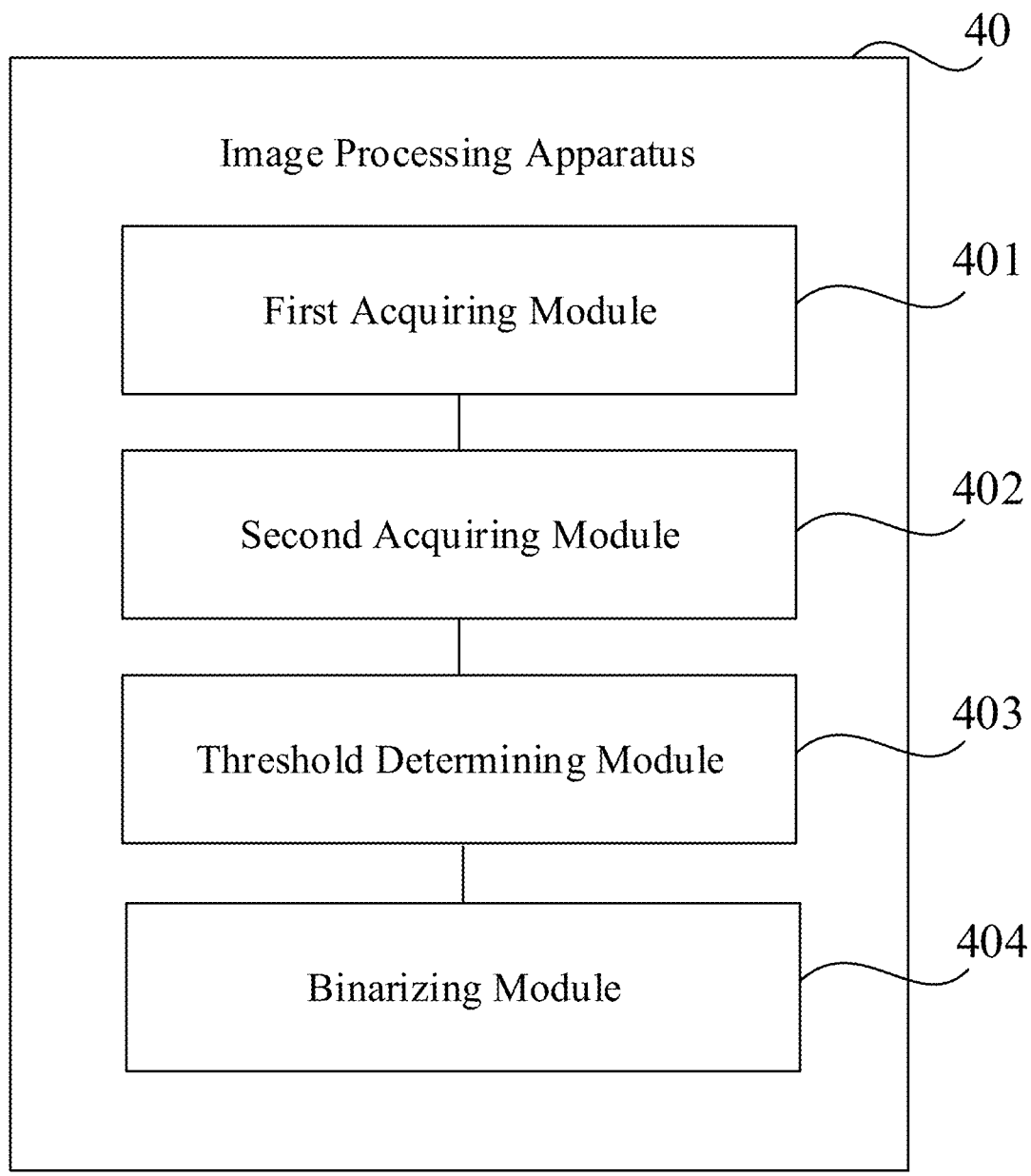
FIG. 12 is a schematic structural diagram of an image processing apparatus according to an embodiment of the present disclosure.

At least one embodiments of the present disclosure provides an image processing device 40. As illustrated in FIG. 12, the image processing device comprises:

a first acquiring module 401, configured to acquire an initial image comprising an image of pupil;

a second acquiring module 402, configured to acquire an accumulative histogram set of grayscale values of pixels in the initial image;

a threshold determining module 403, configured to determine a threshold for binarizing the initial image according to a grayscale value corresponding to a target region in respective accumulative histogram in the accumulative histogram set, wherein the target region corresponds to the image of pupil in the initial image; and a binarizing module 404, configured to binarize the initial image according to the threshold.

In summary, in the image processing device according to the embodiments of the present disclosure, the second acquiring module acquires an accumulative histogram set according to an acquired initial image, and the threshold determining module determines a threshold for binarization according to a grayscale value corresponding to a target region corresponding to the image of pupil in the accumulative histogram set. Since the threshold is determined according to the characteristics of the histogram of the initial image, and no farfetched assumption exists, the positioning effect has a high robustness, and the precision in positioning the center of pupil is high.

In some embodiments of the present disclosure, the target region in the accumulative histogram is a smooth region closest to the region with a minimum grayscale value in the accumulative histogram, wherein a difference between every two adjacent accumulation values in the flat region is less than a target difference threshold.

In some embodiments of the present disclosure, the threshold determining module 403 is configured to:

compare a reference absolute value with a first difference threshold by taking a first non-zero grayscale value in the respective accumulative histogram as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;

repeatedly compare the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;

determine the current $i^{th}$ grayscale value as a start grayscale value in the respective accumulative histogram, wherein a grayscale value corresponding to the target region comprises the start grayscale value; and determine the threshold according to the start grayscale value in the accumulative histogram set.

In some embodiments of the present disclosure, the threshold determining module 403 is configured to:

repeatedly compare the reference absolute value with a second difference threshold by taking the $(i+x)^{th}$ grayscale value as the $i^{th}$ grayscale value until a quantity of reference absolute values that are consecutive and are less than the second difference threshold reaches a second counting threshold;

determine the current $i^{th}$ grayscale value as an end grayscale value in the respective accumulative histogram, wherein a grayscale value corresponding to the target region comprises the end grayscale value; and determine the threshold according to the start grayscale value and the end grayscale value in the accumulative histogram set.

In some embodiments of the present disclosure, the accumulative histogram set comprises a plurality of accumulative histogram; and the threshold determining module 403 is configured to:

determine a threshold candidate value of each of the plurality of accumulative histograms according to the start grayscale value and the end grayscale value of each of the plurality of accumulative histogram; and determine one of an average value of the threshold candidate values of the plurality of accumulative histograms and a weighted average value of the threshold candidate values of the plurality of accumulative histograms as the threshold.

In some embodiments of the present disclosure, the threshold determining module 403 is configured to:

determine a grayscale value set according to the start grayscale value and the end grayscale value of each of the plurality of accumulative histograms, wherein the grayscale value set comprises the start grayscale value and the end grayscale value, and grayscale values between the start grayscale value and the end grayscale value; and determine a threshold candidate value of each of the plurality of accumulative histograms according to the grayscale value set, the threshold candidate value being one of a random value, a maximum value, a minimum value, an average value, and a weighted average value of the grayscale values in the grayscale value set, and an average value of the maximum value and the minimum value.

In some embodiments of the present disclosure, the accumulative histogram set comprises at least one of a first accumulative histogram and a second accumulative histogram, the second accumulative histogram being obtained by performing edge blurring on the first accumulative histogram.

In some embodiments of the present disclosure, the accumulative histogram set comprises a first accumulative histogram; and the second acquiring module 402 is configured to:

establish a histogram according to the initial image, wherein a horizontal axis of the histogram represents a grayscale value, and a vertical axis of the histogram represents distribution of pixels with the grayscale value; and establish a first accumulative histogram according to the histogram, wherein a horizontal axis of the first accumulative histogram represents a grayscale value, and a vertical axis of the first accumulative histogram represents accumulation of the distribution of the pixels with the grayscale value.

Figure 13:
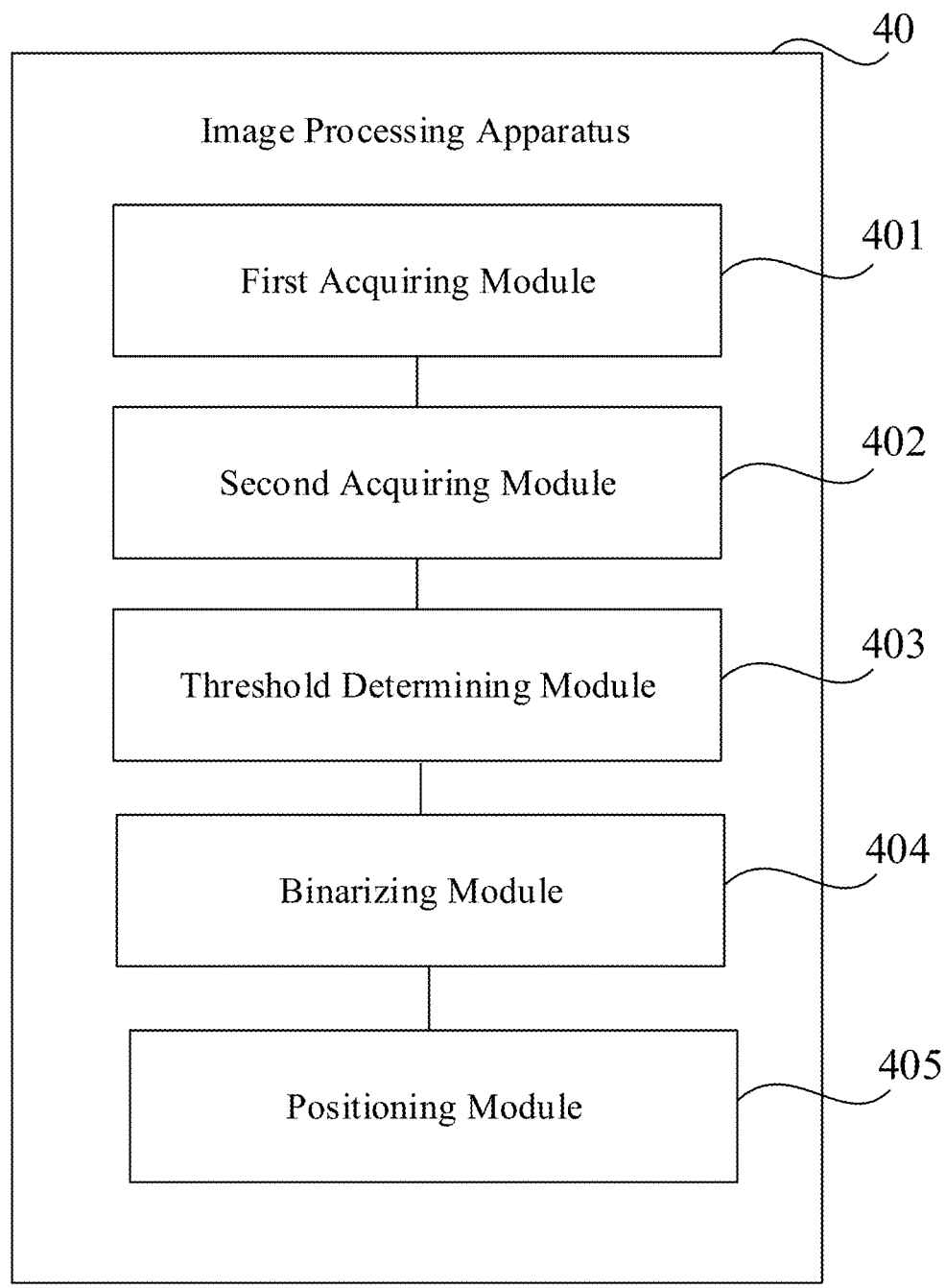
FIG. 13 is a schematic structural diagram of an image processing apparatus according to another embodiment of the present disclosure.

In some embodiments of the present disclosure, as illustrated in FIG. 13, the image processing device 40 further comprises:

a positioning module 405, configured to perform at least one of edge detection and ellipse fitting on the binarized image to obtain a pupil positioning image.

In summary, in the image processing apparatus according to the embodiments of the present disclosure, the second acquiring module acquires an accumulative histogram set according to an acquired initial image, and the threshold determining module determines a threshold for binarization according to a grayscale value corresponding to a target region corresponding to a pupil in the accumulative histogram set. Since the threshold is determined according to the characteristics of the histogram of the initial image, and no farfetched assumption exists, the positioning effect has a high robustness, and the precision in positioning the center of the pupil is high.

At least one embodiment of the present disclosure provides an image processing apparatus, comprising:

a processor; and a memory configured to store at least one instruction executable by the processor;

wherein the processor is configured to acquire an initial image comprising an image of pupil; acquire an accumulative histogram set of grayscale values of pixels in the initial image; determine a threshold for binarizing the initial image according to a grayscale value corresponding to a target region in respective accumulative histogram in the accumulative histogram set, wherein the target region corresponds to the image of pupil in the initial image; and binarize the initial image according to the threshold.

In some embodiments of the present disclosure, the process is further configured to perform the image processing method according to any one of the embodiments as described above.

At least one embodiment of the present disclosure provides a wearable device, comprising the image processing apparatus according to the above embodiment. The wearable device may be an AR device or a VR device.

At least one embodiment of the present disclosure provides a non-transitory computer-readable storage medium storing at least one instruction thereon. The non-transitory computer-readable storage medium, when being run on a processing component, causes the processing component to acquire an initial image comprising an image of pupil; acquire an accumulative histogram set of grayscale values of pixels in the initial image; determine a threshold for binarizing the initial image according to a grayscale value corresponding to a target region in respective accumulative histogram in the accumulative histogram set, wherein the target region corresponds to the image of pupil in the initial image; and binarize the initial image according to the threshold.

In some embodiments of the present disclosure, when being run on the processing component, the non-transitory computer-readable storage medium further causes the processing component to perform the image processing method according to any one of the embodiments as described above.

Figure 14:
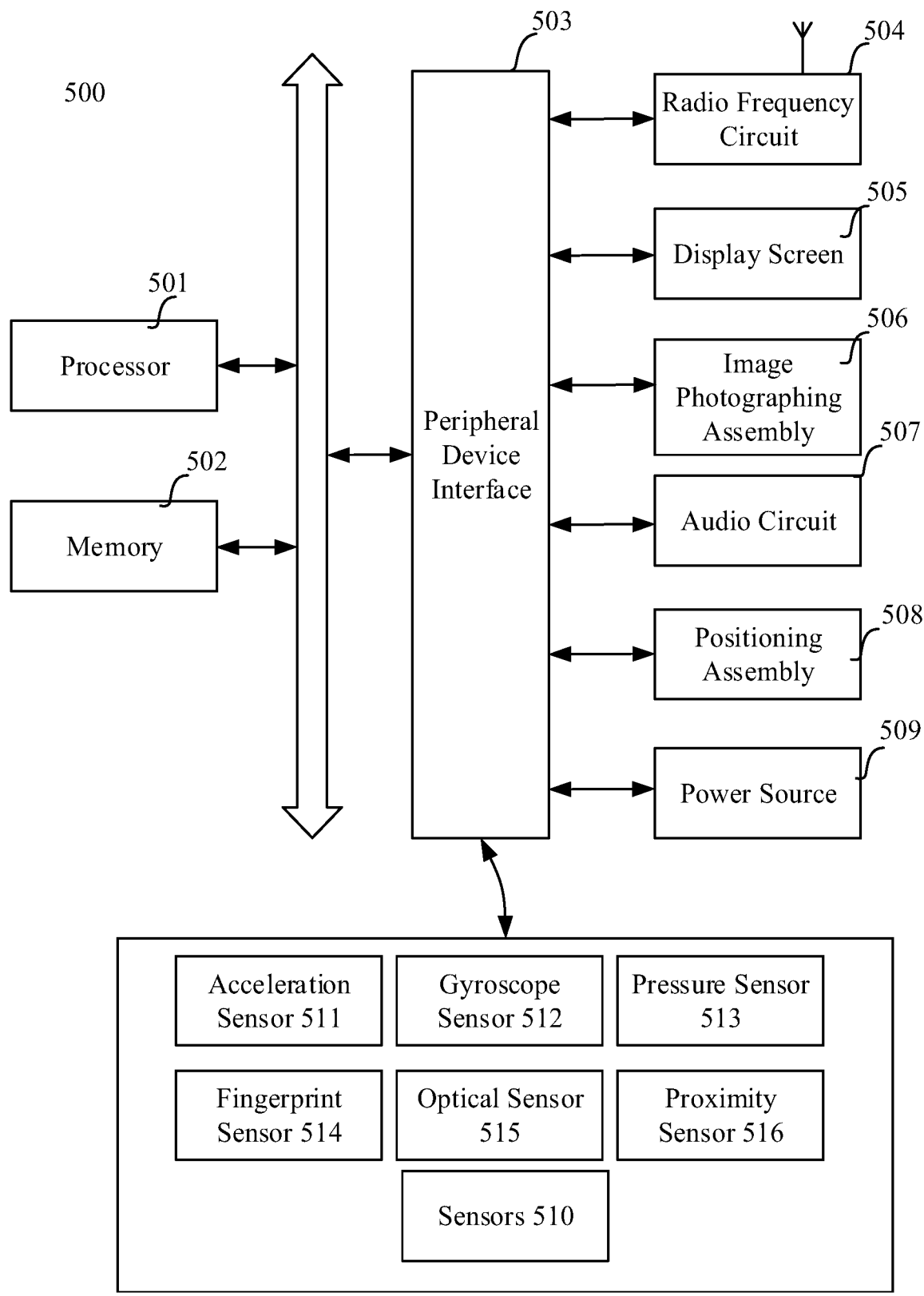
FIG. 14 is a schematic structural diagram of a device for use in image processing according to an embodiment of the present disclosure.

FIG. 14 is a schematic structural block diagram of an image processing apparatus 500 according to an exemplary embodiment of the present disclosure. The image processing apparatus 500 may be a wearable device, or a control device connected to the wearable device.

Generally, the image processing apparatus 500 comprises a processor 501 and a memory 502.

The processor 501 may comprise one or a plurality of processing cores, for example, a four-core processor, an eight-core processor or the like. The processor 501 can be implemented based on a hardware form of at least one of digital signal processing (DSP), field-programmable gate array (FPGA), and programmable logic array (PLA). The processor 501 can further comprise a primary processor and a secondary processor. The primary processor is a processor configured to process data in an active state, and is also referred to as a central processing unit (CPU); and the secondary processor is a low-power consumption processor configured to process data in a standby state. In some embodiments, the processor 501 may be integrated in a graphics processing unit (GPU), wherein the GPU is configured to render and draw the content to be displayed on the screen. In some embodiments, the processor 501 may further comprises an artificial intelligence (AI) processor, wherein the AI processor is configured to process calculation operations related to machine learning.

The memory 502 may comprise one or more computer-readable storage media, wherein the computer-readable storage medium may be non-transitory. The memory 502 may comprise a high-speed random access memory, and a non-volatile memory, for example, one or more magnetic disk storage devices or flash storage devices. In some embodiments, the non-transitory computer-readable storage medium in the memory 502 may be configured to store at least one instruction, wherein the at least one instruction is executed by the processor 501 to perform the image processing method according to the embodiments of the present disclosure.

Further, when the device 500 can be a wearable device which may comprise a wearable structure, configured to wear the wearable device on the human body. For example, the wearable structure may be a headgear, a binding band, or a C-shaped attachment clips mating with the shape of the head.

In some embodiments, the image processing apparatus 500 may optionally comprise a peripheral device interface 503 and at least one peripheral device. The processor 501, the memory 502 and the peripheral device interface 503 may be connected to each other via a bus or a signal line. The respective peripheral devices may be connected to the peripheral device interface 503 via a bus, a signal line or a circuit board. The peripheral device comprises at least one of a radio frequency circuit 504, a display screen 505, a camera assembly 506, an audio circuit 507, a positioning assembly 508 and a power source 509.

The peripheral device interface 503 may be configured to connect the at least one peripheral device related to input/output (I/O) to the processor 501 and the memory 502. In some embodiments of the present disclosure, the processor 501, the memory 502 and the peripheral device interface 503 are integrated on the same chip or the same circuit board. In some other embodiments, any one or two of the processor 501, the memory 502 and the peripheral device interface 503 can be implemented on a separate chip or a circuit board, which is not limited in this embodiment.

The radio frequency circuit 504 is configured to receive and transmit a radio frequency (RF) signal, which is also referred to as an electromagnetic signal. The radio frequency circuit 504 communicates with a communication network or another communication device via the electromagnetic signal. The radio frequency circuit 504 converts an electrical signal to an electromagnetic signal and sends the signal, or converts a received electromagnetic signal to an electrical signal. Optionally, the radio frequency circuit 504 comprises an antenna system, an RF transceiver, one or more amplifiers, a tuner, an oscillator, a digital signal processor, a codec chip set, a subscriber identification module card or the like. The radio frequency circuit 504 may communicate with another terminal based on a wireless communication protocol. The wireless communication protocol comprises, but not limited to: a World-Wide-Web, a metropolitan area network, an intranet, generations of mobile communication networks (comprising 2G, 3G, 4G and 5G), a wireless local area network and/or a wireless fidelity (WiFi) network. In some embodiments, the radio frequency circuit 5024 may further comprise a near field communication (NFC)-related circuits, which is not limited in the present disclosure.

The display screen 505 may be configured to display a user interface (UI). The UE may comprise graphics, texts, icons, videos and any combination thereof. When the display screen 505 is a touch display screen, the display screen 505 may further have the capability of acquiring a touch signal on a surface of the display screen 505 or above the surface of the display screen 505. The touch signal may be input to the processor 501 as a control signal for further processing. In this case, the display screen 505 may be further configured to provide a virtual button and/or a virtual keyboard or keypad, also referred to as a soft button and/or a soft keyboard or keypad. In some embodiments, one display screen 505 may be provided, which is arranged on a front panel of the terminal 500. In some other embodiments, at least two display screens 505 are provided, which are respectively arranged on different surfaces of the image processing apparatus 500 or designed in a foldable fashion. In still some other embodiments, the display screen 505 may be a flexible display screen, which is arranged on a bent surface or a foldable surface of the image processing apparatus 500. Even, the display screen 505 may be further arranged to an irregular pattern which is non-rectangular, that is, a specially-shaped screen. The display screen 505 may be a liquid crystal array display screen (LCD), an organic light-emitting diode (OLED) display screen or the like.

The image photographing assembly 506 is configured to capture an image or a video. Optionally, the image photographing assembly 506 comprises a front camera and a rear camera. Typically, the front camera is arranged on a front panel of the terminal, and the rear camera is arranged on a rear side of the terminal. In some embodiments, at least two rear cameras are arranged, which are respectively any one of a primary camera, a depth of field (DOF) camera, a wide-angle camera and a long-focus camera, such that the primary camera and the DOF camera are fused to implement the background virtualization function, and the primary camera and the wide-angle camera are fused to implement the panorama photographing and virtual reality (VR) photographing functions or other fused photographing functions. In some embodiments, the image photographing assembly 506 may further comprise a flash. The flash may be a single color temperature flash or a double color temperature flash. The double color temperature flash refers to a combination of a warm-light flash and a cold-light flash, which may be used for light compensation under different color temperatures. Further, the image capturing assembly may comprise an infrared device, for example, an infrared camera, wherein the infrared camera may comprise a plurality of infrared LEDs. The image capturing assembly may be embedded in the wearable device.

The audio circuit 507 may comprise a microphone and a speaker. The microphone is configured to capture an acoustic wave of a user and an environment, and convert the acoustic wave to an electrical signal and output the electrical signal to the processor 501 for further processing, or output to the radio frequency circuit 504 to implement voice communication. For stereo capturing or noise reducing, a plurality of such microphones are provided and are respectively arranged at different positions of the image processing apparatus 500. The microphone may also be a microphone array or an omnidirectional capturing microphone. The speaker is configured to convert an electrical signal from the processor 501 or the radio frequency circuit 5024 to an acoustic wave. The speaker may be a conventional thin-film speaker, or may be a piezoelectric ceramic speaker. When the speaker is a piezoelectric ceramic speaker, it can convert an electrical signal to an acoustic wave audible by human beings, or convert an electrical signal to an acoustic wave inaudible by human beings for ranging or the like. In some embodiments, the audio circuit 507 may further comprise a headphone jack.

The positioning assembly 508 is configured to determine a current geographical position of the image processing apparatus 500 to implement navigation or a local based service (LBS). The positioning assembly 508 may be the global positioning system (GPS) from the United States, the Beidou positioning system from China, the Global Navigation Satellite System (GLONASS) from Russia or the Galileo satellite navigation system from the European Union.

The power source 509 is configured to supply power for the components in the image processing apparatus 500. The power source 509 may be an alternating current source, a direct current source, a disposable battery or a rechargeable battery. When the power source 509 comprises a rechargeable battery, the rechargeable battery may be charged in a wired or wireless manner. The rechargeable battery can further support the supercharging technology.

In some embodiments, the image processing apparatus 500 may further comprise one or more sensors 510. The one or more sensors 510 comprise, but not limited to: an acceleration sensor 511, a gyroscope sensor 512, a pressure sensor 513, a fingerprint sensor 514, an optical sensor 515 and a proximity sensor 516.

The acceleration sensor 511 may detect accelerations on three coordinate axes in a coordinate system established for the image processing apparatus 500. For example, the acceleration sensor 511 may be configured to detect components of the gravity acceleration on the three coordinate axes. The processor 501 may control the touch display screen 5025 to display the user interface in a horizontal view or a longitudinal view based on the gravity acceleration signal acquired by the acceleration sensor 511. The acceleration sensor 511 may be further configured to acquire motion data of a game or a user.

The gyroscope sensor 512 may detect a direction and a rotation angle of the image processing apparatus 500, and the gyroscope sensor 512 may cooperate with the acceleration sensor 511 to capture a 3D action performed by the user for the terminal 500. Based on the data acquired by the gyroscope sensor 512, the processor 501 may implement the following functions: action sensing (for example, change the UI according to an inclination operation of the user), image stabilization during the photographing, game control and inertial navigation.

The pressure sensor 513 may be arranged on a side frame of the image processing apparatus 500 and/or on a lowermost layer of the touch display screen 505.

The fingerprint sensor 514 is configured to acquire fingerprints of the user, and the processor 501 determines the identity of the user based on the fingerprints acquired by the fingerprint sensor 514, or the fingerprint sensor 514 determines the identity of the user based on the acquired fingerprints. When the user is authenticated, the processor 501 authorizes the user to perform related sensitive operations, wherein the sensitive operations comprise unlocking the screen, checking encrypted information, downloading software, paying and modifying settings and the like. The fingerprint sensor 514 may be arranged on a front side, a back side or a lateral side of the image processing apparatus 500. When the image processing apparatus 500 is provided with a physical key or a manufacturer's logo, the fingerprint sensor 514 may be integrated with the physical key or the manufacturer's logo.

The optical sensor 515 is configured to acquire the intensity of ambient light. In one embodiment, the processor 501 can control a display luminance of the touch display screen 505 based on the intensity of ambient light acquired by the optical sensor 515. For example, if the intensity of ambient light is high, the display luminance of the touch display screen 505 will be up-shifted; and if the intensity of ambient light is low, the display luminance of the touch display screen 505 will be down-shifted. In another embodiment, the processor 501 can further dynamically adjust photographing parameters of the image photographing assembly 506 based on the intensity of ambient light acquired by the optical sensor.

The proximity sensor 516, also referred to as a distance sensor, is generally arranged on the front panel of the image processing apparatus 500. The proximity sensor 516 is configured to acquire a distance between the user and the front side of the image processing apparatus 500.

One of ordinary skill in the art can understand that the structure of the terminal as illustrated in FIG. 14 cannot be construed as a limitation on the image processing apparatus 500. The image processing apparatus may comprise more or less components with respect to those illustrated in FIG. 14, or may be combined with some components, or may employ different component deployments.

It should be clearly understood by one of ordinary skill in the art that for ease and brevity of description, the operation of the above described apparatuses and modules can be referred to the relevant portions in the above described method embodiments, which will not be elaborated.

It should be noted that, all or parts of the steps described in the above embodiments can be implemented through hardware, or through relevant hardware instructed by applications stored in a non-transitory computer readable storage medium, such as a read-only memory, a disk or a CD, etc.

In the present disclosure, the expression "at least one" refers to one or more, and the expression "a plurality of" indicates two or more than two. The expression "at least one of the following" or the like means any combination of the items or options listed, comprising a single item or option or any combination of plural items or options listed. For example, the expression "at least one of a, b or c" can signify a, b, c, a+b, b+c, and a+b+c, wherein a, b and c may be a single item or option or may be plural items or options.

The term "and/or" is merely an association relationship for describing associated objects, which represents that there may exist three types of relationships, for example, A and/or B may represent three situations: only A exists, both A and B exist, and only B exists. In addition, the character "/" herein generally represents an "or" relationship between associated objects before and after the character.

It should be noted that the method embodiments and the corresponding device embodiments of the present disclosure may be cross referenced, which is not limited in the embodiments of the present disclosure. The sequence of the steps in the method embodiments may be adjusted appropriately, and the steps may be deleted or added according to the situation. Within the technical scope disclosed in the present disclosure, any variations of the method easily derived by one of ordinary skill in the art shall fall within the protection scope of the present disclosure, which is not repeated here.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. An image processing method, comprising:
    acquiring an initial image comprising an image of pupil;
    acquiring an accumulative histogram set of grayscale values of pixels in the initial image;
    determining a threshold for binarizing the initial image according to a grayscale value corresponding to a target region in respective accumulative histograms in the accumulative histogram set, wherein the target region corresponds to the image of pupil in the initial image; and
    binarizing the initial image according to the threshold, wherein determining the threshold for binarizing the initial image according to the grayscale value corresponding to the target region in the respective accumulative histograms in the accumulative histogram set comprises:
    comparing a reference absolute value with a first difference threshold by taking a first non-zero grayscale value in the respective accumulative histograms as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;
    repeatedly comparing the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;
    determining the current $i^{th}$ grayscale value as a start grayscale value in the respective accumulative histograms, wherein the grayscale value corresponding to the target region comprises the start grayscale value; and
    determining the threshold according to the start grayscale value in the accumulative histogram set.

2. The method according to claim 1, wherein the target region in the respective accumulative histograms is a smooth region closest to a region having a smallest grayscale value in the respective accumulative histograms, wherein a difference between every two adjacent accumulative values of the smooth region is less than a target difference threshold.

3. The method according to claim 1, wherein determining the threshold according to the start grayscale value in the accumulative histogram set comprises:
    repeatedly comparing the reference absolute value with a second difference threshold by taking the current $(i+x)^{th}$ grayscale value as the $i^{th}$ grayscale value until a quantity of reference absolute values that are consecutive and are less than the second difference threshold reaches a second counting threshold;
    determining the current $i^{th}$ grayscale value as an end grayscale value in the respective accumulative histograms, wherein the grayscale value corresponding to the target region comprises the end grayscale value; and
    determining the threshold according to the start grayscale value and the end grayscale value in the accumulative histogram set.

4. The method according to claim 3, wherein the accumulative histogram set comprises a plurality of accumulative histograms; and determining the threshold according to the start grayscale value and the end grayscale value in the accumulative histogram set comprises:
    determining a threshold candidate value of the respective accumulative histograms according to the start grayscale value and the end grayscale value of the respective accumulative histogram; and
    determining one of an average value of the threshold candidate value of the respective accumulative histograms and a weighted average value of the threshold candidate value of the respective accumulative histograms as the threshold.

5. The method according to claim 4, wherein determining the threshold candidate value of the respective accumulative histograms according to the start grayscale value and the end grayscale value of the respective accumulative histograms comprises:
    determining a grayscale value set according to the start grayscale value and the end grayscale value of the respective accumulative histograms, wherein the grayscale value set comprises the start grayscale value and the end grayscale value, and grayscale values between the start grayscale value and the end grayscale value; and
    determining the threshold candidate value of the respective accumulative histograms according to the grayscale value set, the threshold candidate value being any of a random value, a maximum value, a minimum value, an average value, a weighted average value of the grayscale values in the grayscale value set, and an average value of the maximum value and the minimum value.

6. The method according to claim 1, wherein the accumulative histogram set comprises at least one of a first accumulative histogram and a second accumulative histogram, and the second accumulative histogram is obtained by performing edge blurring on the first accumulative histogram.

7. The method according to claim 6, wherein the accumulative histogram set comprise a first accumulative histogram; and acquiring the accumulative histogram set of grayscale values of pixels in the initial image comprises:

establishing a histogram based on the initial image, wherein a horizontal axis of the histogram represents grayscale values, and a vertical axis of the histogram represents distribution of pixels with respective grayscale values; and establishing the first accumulative histogram based on the histogram, wherein a horizontal axis of the first accumulative histogram represents grayscale values, and a vertical axis of the first accumulative histogram represents accumulation of the distribution of the pixels with the respective grayscale values.

8. The method according to claim 1, wherein after binarizing the initial image according to the threshold, the method further comprises:

performing at least one of edge detection and ellipse fitting on a binarized image to obtain a pupil positioning image.

9. The method according to claim 1, wherein the accumulative histogram set comprise a first accumulative histogram and a second accumulative histogram; and acquiring the accumulative histogram set of grayscale values of pixels in the initial image comprises:

establishing a histogram based on the initial image, wherein a horizontal axis of the histogram represents grayscale values, and a vertical axis of the histogram represents ratios of pixels with the respective grayscale values; and establishing the first accumulative histogram based on the histogram, wherein a horizontal axis of the first accumulative histogram represents the grayscale values, and a vertical axis of the first accumulative histogram represents an accumulative value of the ratios of the pixels with the respective grayscale values; and performing edge blurring on the first accumulative histogram to obtain the second accumulative histogram;

after binarizing the initial image according to the threshold, the method further comprises:

performing at least one of edge detection and ellipse fitting on a binarized image to obtain a pupil positioning image.

10. An image processing apparatus, comprising:
a processor; and
a memory, configured to store at least one instruction executable by the processor;
wherein the processor is configured to:
acquire an initial image comprising an image of pupil;
acquire an accumulative histogram set of grayscale values of pixels in the initial image;
determine a threshold for binarizing the initial image according to a grayscale value corresponding to a target region in respective accumulative histograms in the accumulative histogram set, wherein the target region corresponds to the image of pupil in the initial image; and
binarize the initial image according to the threshold, wherein the processor is further configured to:
compare a reference absolute value with a first difference threshold by taking a first non-zero grayscale value in the respective accumulative histograms as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;
repeatedly compare the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;

determine the current $i^{th}$ grayscale value as a start grayscale value in the respective accumulative histograms, wherein the grayscale value corresponding to the target region comprises the start grayscale value; and determine the threshold according to the start grayscale value in the accumulative histogram set wherein the processor is further configured to:

compare a reference absolute value with a first difference threshold by taking a first non-zero grayscale value in the respective accumulative histograms as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;

repeatedly compare the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;

determine the current $i^{th}$ grayscale value as a start grayscale value in the respective accumulative histograms, wherein the grayscale value corresponding to the target region comprises the start grayscale value; and determine the threshold according to the start grayscale value in the accumulative histogram set.

11. The image processing apparatus according to claim 10, wherein the processor is further configured to:

repeatedly compare the reference absolute value with a second difference threshold by taking the current $(i+x)^{th}$ grayscale value as the $i^{th}$ grayscale value until a quantity of reference absolute values that are consecutive and are less than the second difference threshold reaches a second counting threshold;

determine the current $i^{th}$ grayscale value as an end grayscale value in the respective accumulative histograms, wherein the grayscale value corresponding to the target region comprises the end grayscale value; and determine the threshold according to the start grayscale value and the end grayscale value in the accumulative histogram set.

12. The image processing apparatus according to claim 11, wherein the accumulative histogram set comprises a plurality of accumulative histograms; and the processor is further configured to:

determine a threshold candidate value of the respective accumulative histograms according to the start grayscale value and the end grayscale value of the respective accumulative histograms; and determine one of an average value of the threshold candidate value of the plurality of accumulative histograms and a weighted average value of the threshold candidate value of the plurality of accumulative histograms as the threshold.

13. The image processing apparatus according to claim 12, wherein the processor is further configured to:

determine a grayscale value set according to the start grayscale value and the end grayscale value of the respective accumulative histograms, wherein the grayscale value set comprises the start grayscale value and the end grayscale value, and grayscale values between the start grayscale value and the end grayscale value; and determine a threshold candidate value of the respective accumulative histograms according to the grayscale value set, the threshold candidate value being any of a random value, a maximum value, a minimum value, an average value, and a weighted average value of the grayscale values in the grayscale value set, and an average value of the maximum value and the minimum value.

14. The image processing apparatus according to claim 10, wherein the accumulative histogram set comprises at least one of a first accumulative histogram and a second accumulative histogram, and the second accumulative histogram is obtained by performing edge blurring on the first accumulative histogram.

15. The image processing apparatus according to claim 10, wherein the processor is further configured to:
perform at least one of edge detection and ellipse fitting on a binarized image to obtain a pupil positioning image.

16. The image processing apparatus according to claim 10, wherein the accumulative histogram set comprises a first accumulative histogram and a second accumulative histogram; and the processor is further configured to:
establish a histogram based on the initial image, wherein a horizontal axis of the histogram represents grayscale values, and a vertical axis of the histogram represents a ratio of pixels with the respective grayscale values; and
establish the first accumulative histogram based on the histogram, wherein a horizontal axis of the first accumulative histogram represents the grayscale values, and a vertical axis of the first accumulative histogram represents an accumulative value of the ratios of the pixels with the respective grayscale values;
perform edge blurring on the first accumulative histogram to obtain the second accumulative histogram; and
perform at least one of edge detection and ellipse fitting on a binarized initial image to obtain a pupil positioning image.

17. A wearable device, comprising the image processing apparatus according to claim 10.

18. A non-transitory computer-readable storage medium storing at least one instruction, wherein the computer-readable storage medium, when being run on a processing component, causes the processing component to:
acquire an initial image comprising an image of pupil;
acquire an accumulative histogram set of grayscale values of pixels in the initial image;
determine a threshold for binarizing the initial image according to a grayscale value corresponding to a target region in respective accumulative histograms in the accumulative histogram set, wherein the target region corresponds to the image of pupil in the initial image; and
binarize the initial image according to the threshold,
wherein the computer-readable storage medium, when being run on a processing component, further causes the processing component to:
compare a reference absolute value with a first difference threshold by taking a first non-zero grayscale value in the respective accumulative histograms as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;
repeatedly compare the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;
determine the current $i^{th}$ grayscale value as a start grayscale value in the respective accumulative histograms, wherein the grayscale value corresponding to the target region comprises the start grayscale value; and
determine the threshold according to the start grayscale value in the accumulative histogram set wherein the processor is further configured to:
compare a reference absolute value with a first difference threshold by taking a first non-zero grayscale value in the respective accumulative histograms as an $i^{th}$ grayscale value, wherein the reference absolute value is an absolute value of a difference between an accumulative value corresponding to the $i^{th}$ grayscale value and an accumulative value of an $(i+x)^{th}$ grayscale value, x being a positive integer;
repeatedly compare the reference absolute value with the first difference threshold by taking the $(i+x)^{th}$ grayscale value as the $i^{th}$ grayscale value until a quantity of reference absolute values that are consecutive and are less than the first difference threshold reaches a first counting threshold;
determine the current $i^{th}$ grayscale value as a start grayscale value in the respective accumulative histograms, wherein the grayscale value corresponding to the target region comprises the start grayscale value; and
determine the threshold according to the start grayscale value in the accumulative histogram set.

* * * * *